(12) United States Patent
Wu et al.

(10) Patent No.: US 11,029,736 B2
(45) Date of Patent: Jun. 8, 2021

(54) SUPPORT APPARATUS

(71) Applicant: LENOVO ENTERPRISE SOLUTIONS (SINGAPORE) PTE. LTD., Singapore (SG)

(72) Inventors: Morgan Wu, New Taipei (TW); Chia-Ching Huang, Taipei (TW); Tony Liu, Taipei (TW); Chang-Hsing Lee, New Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 43 days.

(21) Appl. No.: 16/519,302

(22) Filed: Jul. 23, 2019

(65) Prior Publication Data
US 2020/0042051 A1 Feb. 6, 2020

(30) Foreign Application Priority Data

Aug. 1, 2018 (CN) .......................... 201810862824.8

(51) Int. Cl.
*G06F 1/18* (2006.01)
*G11B 33/02* (2006.01)

(52) U.S. Cl.
CPC .............. *G06F 1/187* (2013.01); *G11B 33/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,625,014 B1* | 9/2003 | Tucker | .................... | G06F 1/184 312/223.1 |
| 6,667,880 B2* | 12/2003 | Liu | .................... | G06F 1/183 211/26 |
| 6,853,549 B2* | 2/2005 | Xu | .................... | G06F 1/187 211/26 |
| 7,327,565 B2* | 2/2008 | Chen | .................... | G06F 1/184 211/41.17 |
| 7,495,908 B2* | 2/2009 | Zhang | .................... | G11B 33/123 361/679.33 |
| 7,542,271 B2* | 6/2009 | Chen | .................... | G06F 1/187 248/221.11 |
| 7,611,100 B2* | 11/2009 | Peng | .................... | G11B 33/124 211/41.17 |
| 9,060,426 B2* | 6/2015 | Mo | .................... | H05K 5/0221 |
| 9,330,730 B2* | 5/2016 | Makley | .................... | G11B 33/08 |
| 9,448,600 B2* | 9/2016 | Peng | .................... | G11B 33/128 |
| 2005/0195564 A1* | 9/2005 | Peng | .................... | G11B 33/124 361/679.31 |
| 2007/0268662 A1* | 11/2007 | Zhang | .................... | G06F 1/187 361/679.31 |

* cited by examiner

*Primary Examiner* — Monica E Millner

(57) ABSTRACT

A support apparatus for supporting a hard disk drive in a computer system to enable hard disk replacement under hot-swap operations, the apparatus comprises a rail, a primary bracket coupled to the rail, and a cage to which a hard disk drive is mountable and coupled to the primary bracket. The rail is mountable to a base element such as a main board or the chassis of a computer system. The cage is movable relative to the rail from an operating position to a first cage position, and subsequently from the first cage position toward a second cage position to provide a clearance space in front of the cage, in order to allow the hard disk drive mounted in the cage to be drawn out from the cage for replacement under hot-swap operations.

10 Claims, 24 Drawing Sheets

SUPPORT APPARATUS

CROSS-REFERENCE TO RELATED APPLICATION

This application claims priority under 35 U.S.C § 119 to Chinese Patent Application No. 201810862824.8, filed Aug. 1, 2018, the entire text of which is specifically incorporated by reference herein.

TECHNICAL FIELD

Disclosed herein is a support apparatus for supporting an electronic device in a computer system. In particular, the present disclosure relates to a support apparatus for supporting hard disk drives in a computer system.

DESCRIPTION OF THE RELATED ART

Performance improvements and upgrades of computer systems are continuously sought by system developers and providers. One such improvement is to employ a more powerful CPU in a computer system to increase data processing capacity and speed. An upgraded CPU may have larger physical dimensions and occupy more space in a computer chassis and on circuit boards, causing a decrease in space originally reserved for other components and devices such as hard disk drives. While the remaining space may still be adequate for the hard disk drives, the mounting position and orientation of the hard disk drives may have to be rearranged. This may result in the hard disk drives being mounted to new positions which are insufficient for hot swapping the hard disk drives. It is therefore desirable to provide a support apparatus and assembly to enable hot-swap operations for hard disk drive replacement in computer systems with larger CPUs but without increasing the volume and accommodation capacity of the chassis.

SUMMARY

A support apparatus for supporting a hard disk drive in a computer system to enable hard disk replacement under hot-swap operations, the apparatus comprises a rail, a primary bracket coupled to the rail, and a cage configured to hold one or more hard disk drives and the cage being coupled to the primary bracket. The rail is mountable to a base element such as a main board or the chassis of a computer system. The cage is movable relative to the rail from an operating position to a first cage position, and subsequently from the first cage position toward a second cage position to provide a clearance space in relation to the cage, in order to allow the hard disk drive mounted in the cage to be drawn out from the cage for replacement under hot-swap operations.

BRIEF DESCRIPTION OF DRAWINGS

The features of the embodiments will be more comprehensively understood in conjunction with the accompanying drawings, in which.

DETAILED DESCRIPTION

Figure 1:
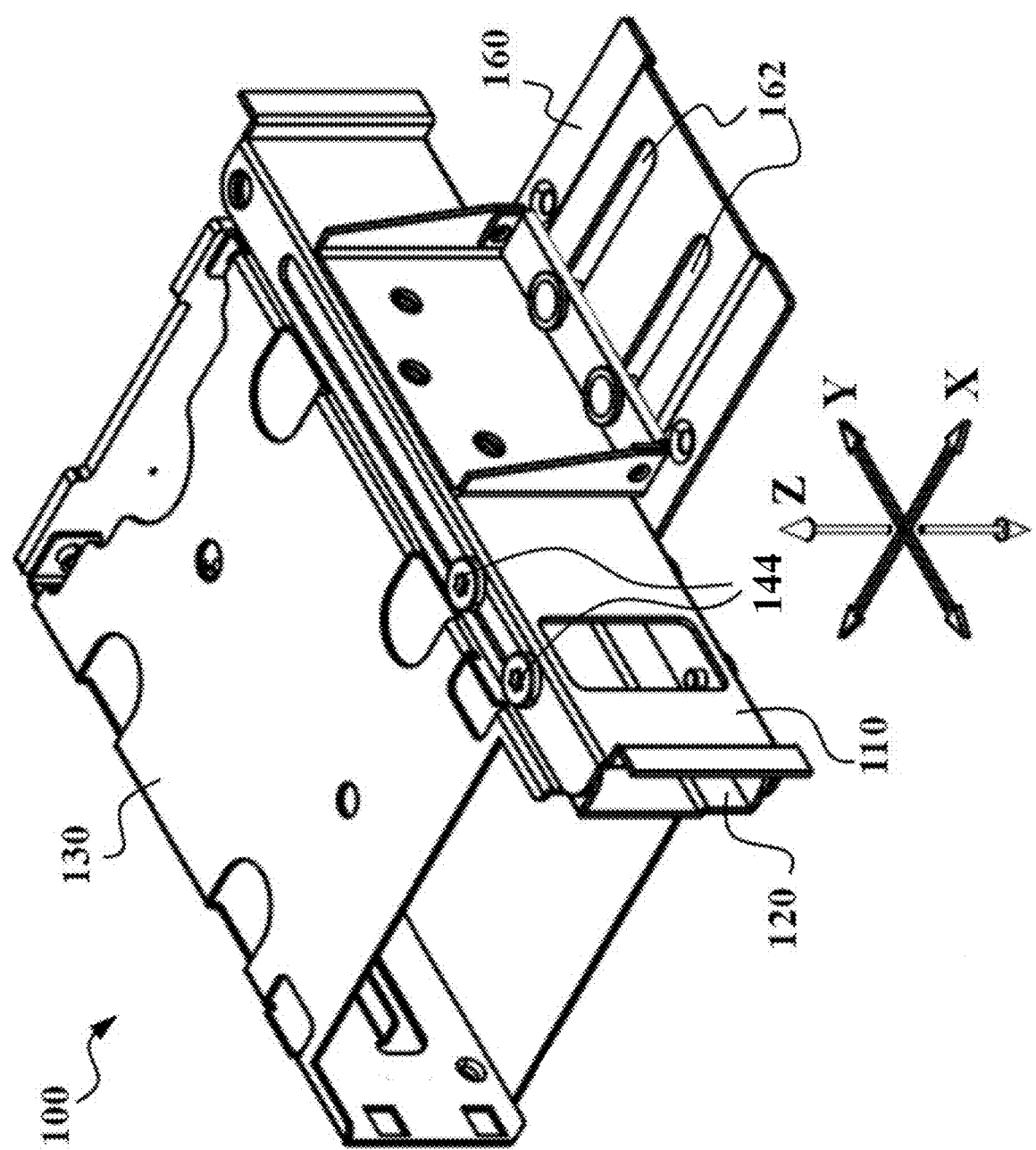
FIG. 1 is a perspective view illustrating a supporting apparatus according to one embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, some or all known structures, materials, or operations may not be shown or described in detail to avoid obfuscation.

According to one aspect, the embodiments herein provide a support apparatus to enable hot swap operation for hard disk drives assembled in computer systems with larger sized CPUs and without increasing the physical dimension of the computer chassis.

According to another aspect, the embodiments herein provide a support apparatus for supporting hard disk drives installed in a computer chassis by which the support assembly is capable of moving the hard disk drives from an operating position to a second cage position for replacement without interrupting the normal operation of the computer system.

The embodiments will be described in detail with reference to the accompanying drawings hereinafter. In the description and the accompanying drawings, the same or similar reference numerals will be used to indicate substantially similar or identical elements and functions, and the duplicate description of these elements and functions may or may not be fully or partially repeated. In addition, for the sake of clarity and simplicity, the description of some or all known functions and constructions in the art can be omitted.

Figure 2:
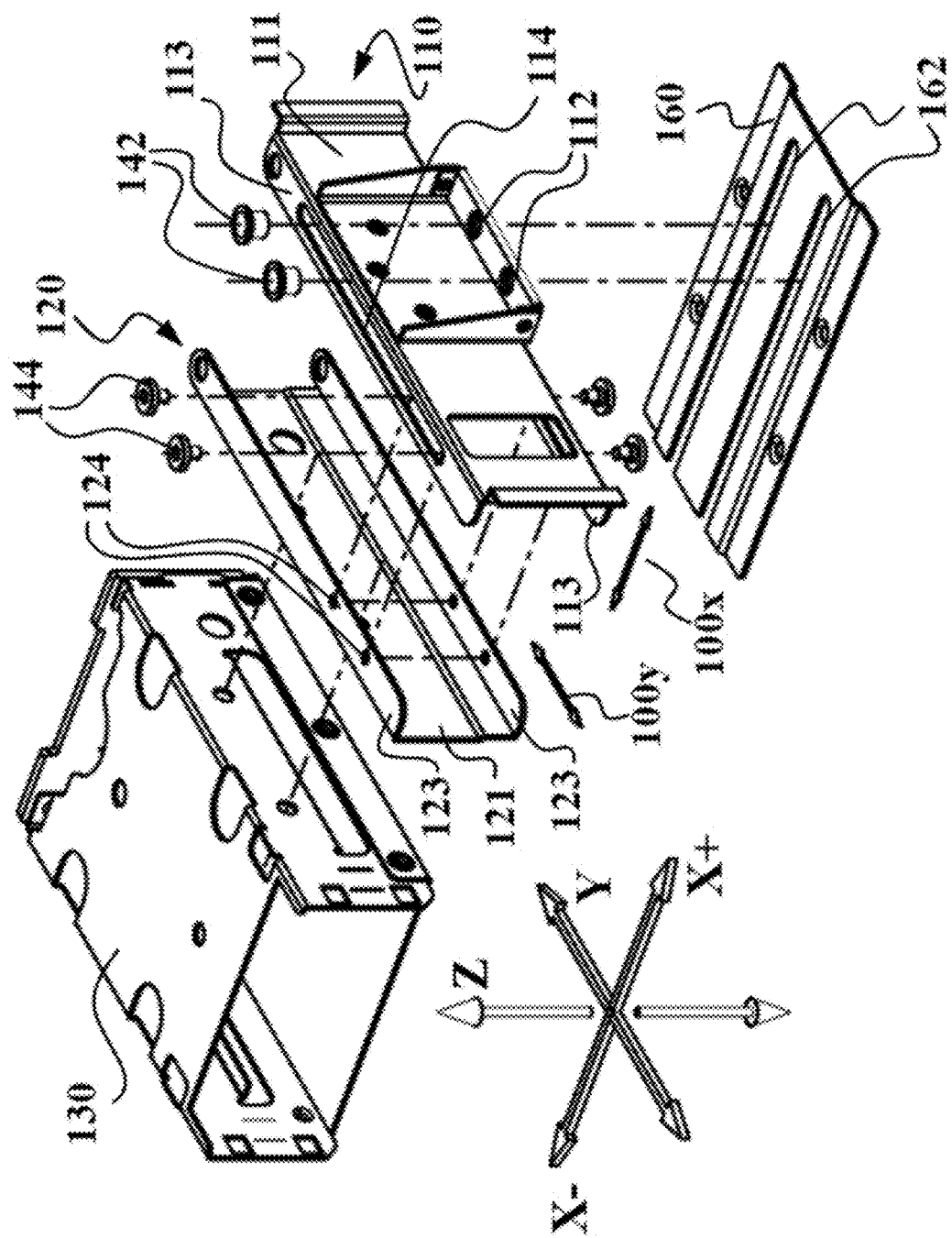
FIG. 2 is an exploded view of FIG. 1.
Figure 3:
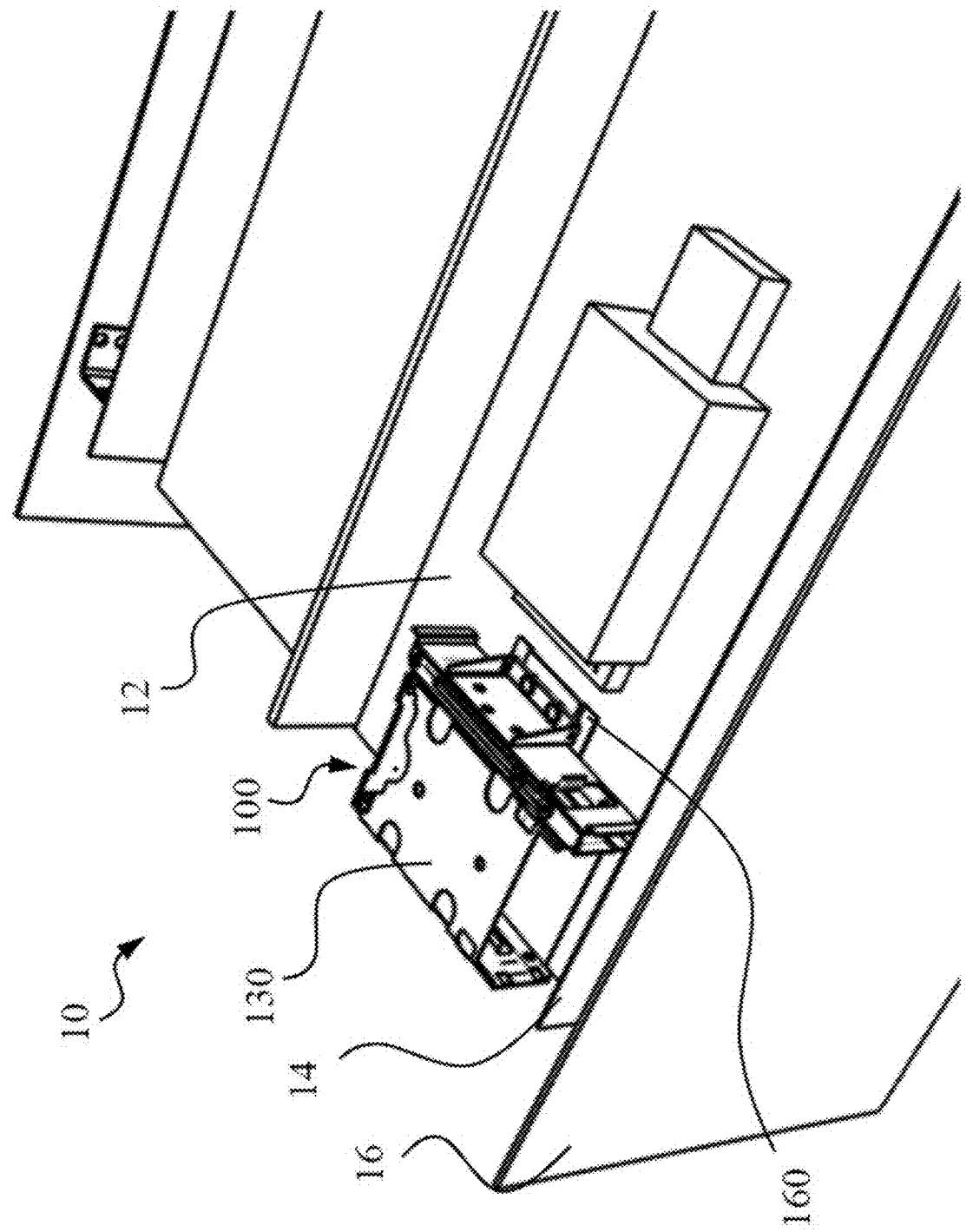
FIG. 3 is a perspective view illustrating a supporting apparatus FIG. 1 mounted to a computer system.
Figure 4:
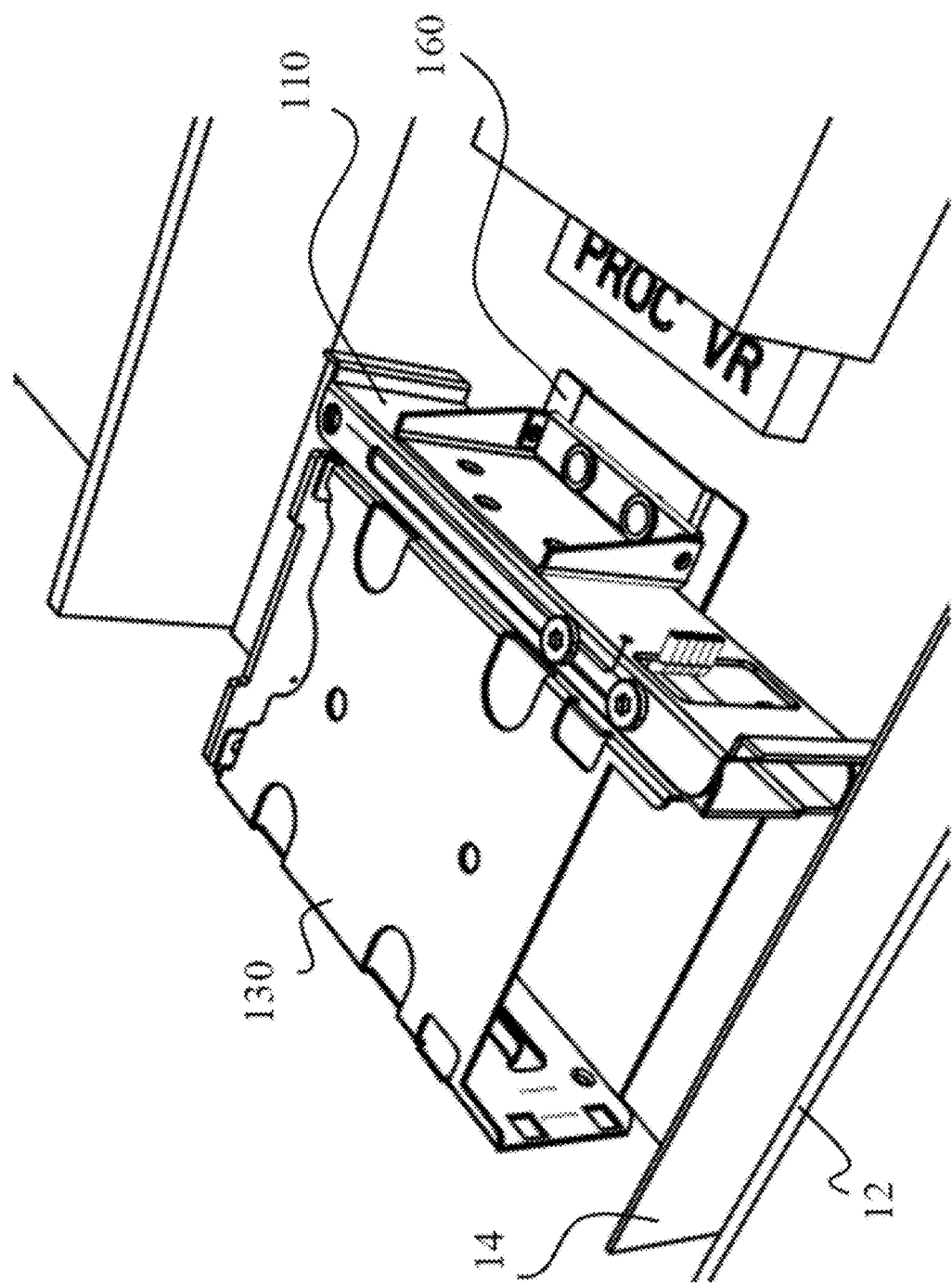
FIG. 4 is an enlarged partial view of FIG. 3.
Figure 5:
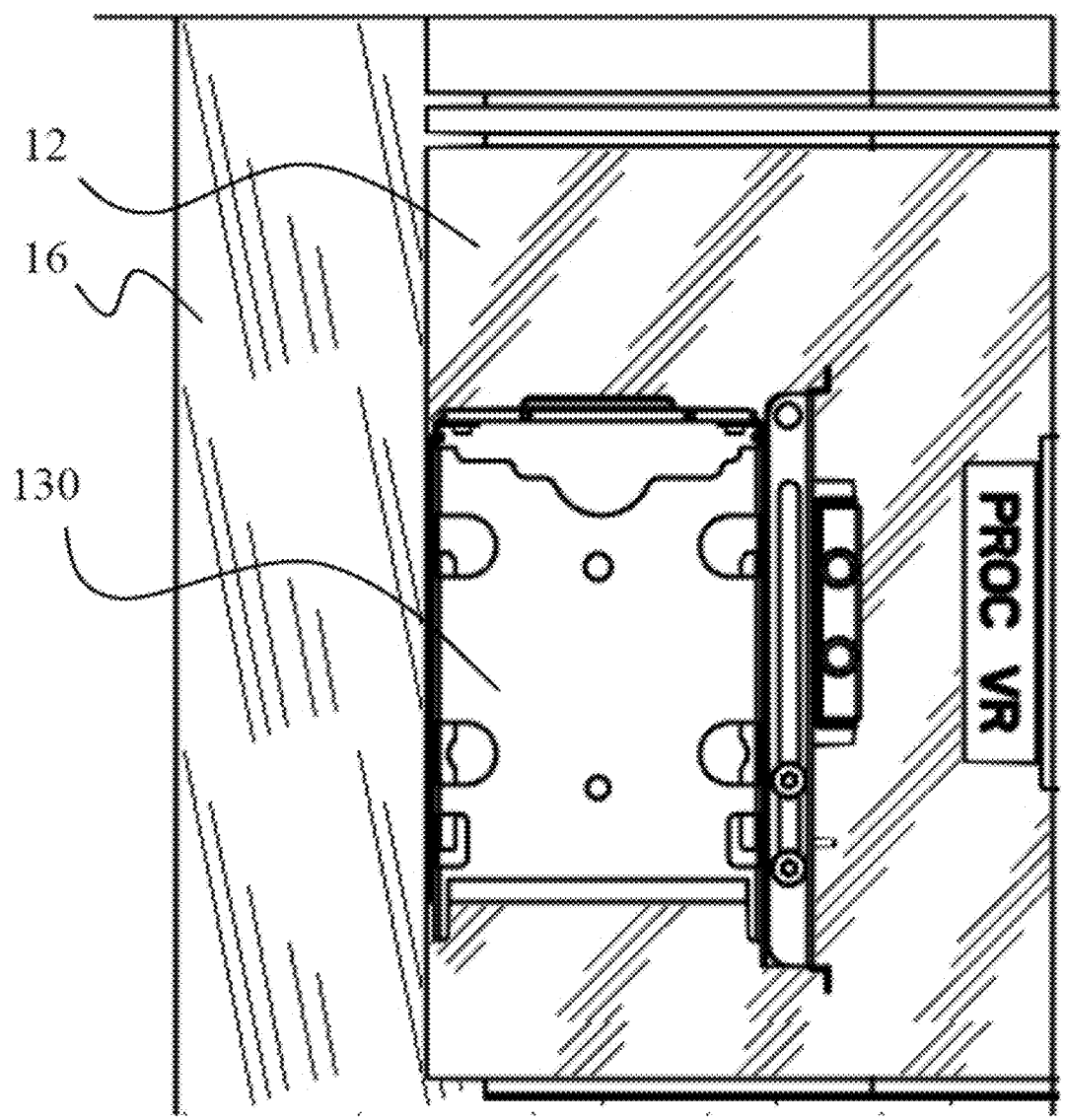
FIG. 5 is a top view of FIG. 3.

As shown in FIGS. 1 and 2, in one embodiment, a support apparatus 100 includes a rail 160, a primary bracket 110 movably coupled to the rail 160, a secondary bracket 120 movably coupled to the primary bracket 110, and a cage 130 mounted to the secondary bracket 120.

Rail 160 has rail slots 162 formed thereon. The primary bracket 110 has coupling holes 112 configured to match corresponding dimension and pitch of the rail slots 162. The primary bracket 110 is movably coupled to the rail slots 162 by fastening elements e.g. rivets 142 secured to the coupling holes 112 and engaged to the rail slots 162. The primary bracket 110 and the rail 160 therefore form a first kinematic pair which allows sliding movement of the primary bracket 110 relative to the rail 160, along a first direction, i.e. the X-direction 100x parallel to the rail slots 162.

The primary bracket 110 has an elongated base portion 111 extending along Y direction, and a pair of side walls 113 extending perpendicularly from the base portion 111, as depicted in FIG. 2. On each side wall 113 there is formed a slot 114 extending along the longitudinal direction of the side wall 113, i.e. the Y direction. Base portion 111 and the pair of side walls 113 form a primary channel opening to the lateral direction of the side wall 113, i.e. the X− direction.

The secondary bracket 120 has an elongated base portion 121 extending along Y direction, and a pair of side walls 123 extending from the base portion 121 toward a same direction i.e. direction X+ as depicted in FIG. 2. On each side wall 123 there is formed mounting holes 124.

The primary bracket 110 and the secondary bracket 120 are assembled together, with the secondary bracket 120 inserted into the channel of the primary bracket 110, and with fastening elements such as screws or rivets 144 passing through the slots 114 and secured to the secondary bracket 120 at the mounting holes 124, as shown in FIG. 1. The primary bracket 110 and the secondary bracket 120 are therefore form a second kinematic sliding pair which enables sliding movement of the secondary bracket 120 relative to the primary bracket 110, along Y-direction 100y which is orthogonal to X-direction 100x.

Cage 130 is fixed to the secondary bracket 120, by riveting or screwing, for instance, therefore the cage 130 follows the movement of the secondary bracket 120 relative to the primary bracket 110 and further, since the primary bracket 110 is movable relative to the rail 160, the cage 130 becomes movable relative to the rail 160, through the secondary bracket 120 and the primary bracket 110.

Figure 6:
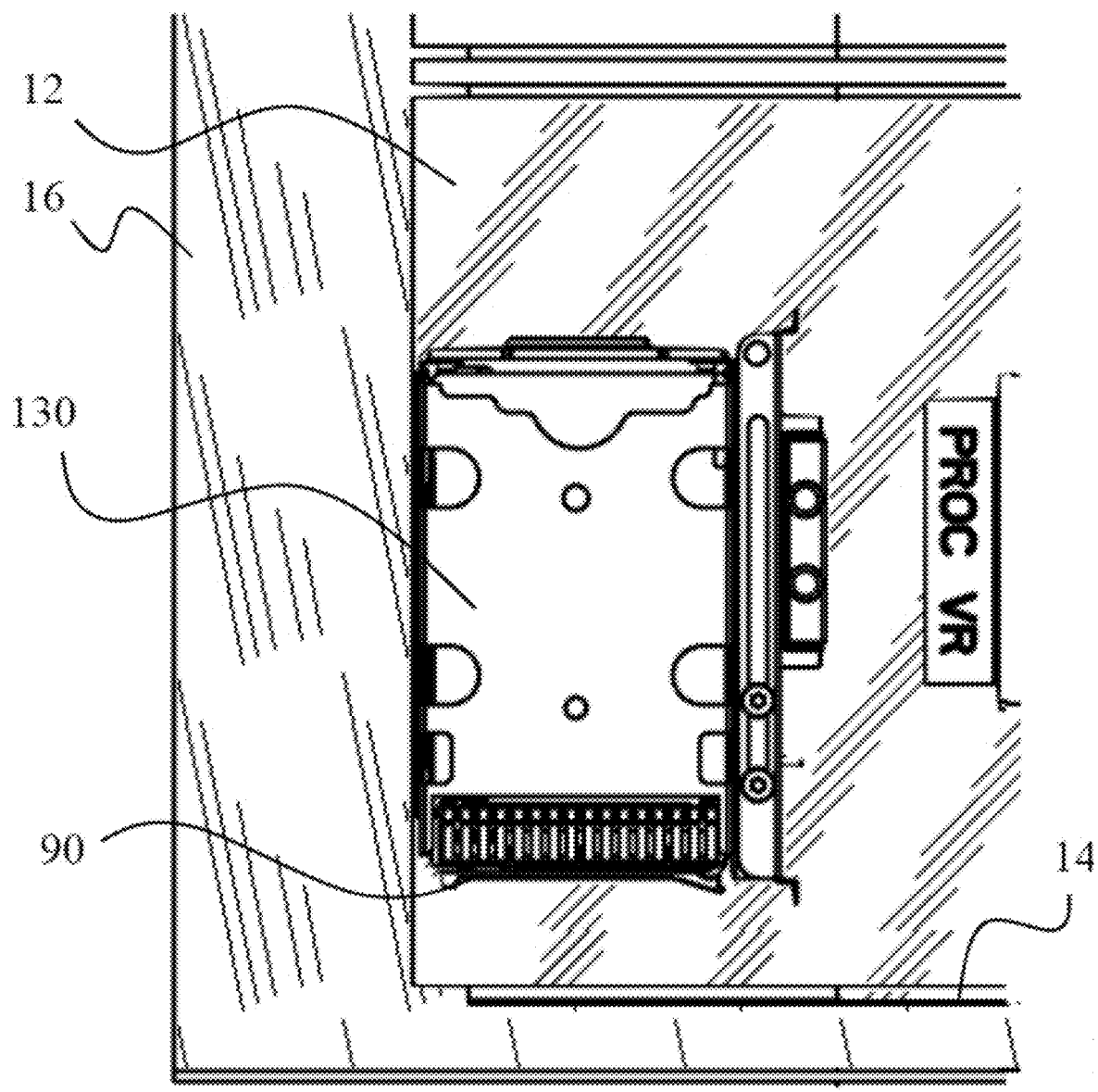
FIG. 6 is a top view of FIG. 3 and a hard disk drive mounted to the support apparatus.

In use, as shown in FIGS. 3, 4, 5 and 6, support apparatus 100 together with one or more hard disk drives 90 received in the cage 130, are assembled to an electronic system e.g. a computer 10, with the rail 160 mounted to a main board 12 of a module 14 which is mounted to a chassis 16 of the computer system 10. In a working position, as shown in FIG. 6, the hard disk drive 90 is located in the module 14, and connected to other components of the module 14 and the computer system 10 to perform operational functions.

A support apparatus illustrated above is capable of enabling hot-swap operation for hard disk drive replacement in a computer system, in particular, in computer systems in which a space or room required for accommodating the hard disk drive and the cage is insufficient to allow removal of the hard disk drive from the cage under hot-swap conditions.

Figure 7A:
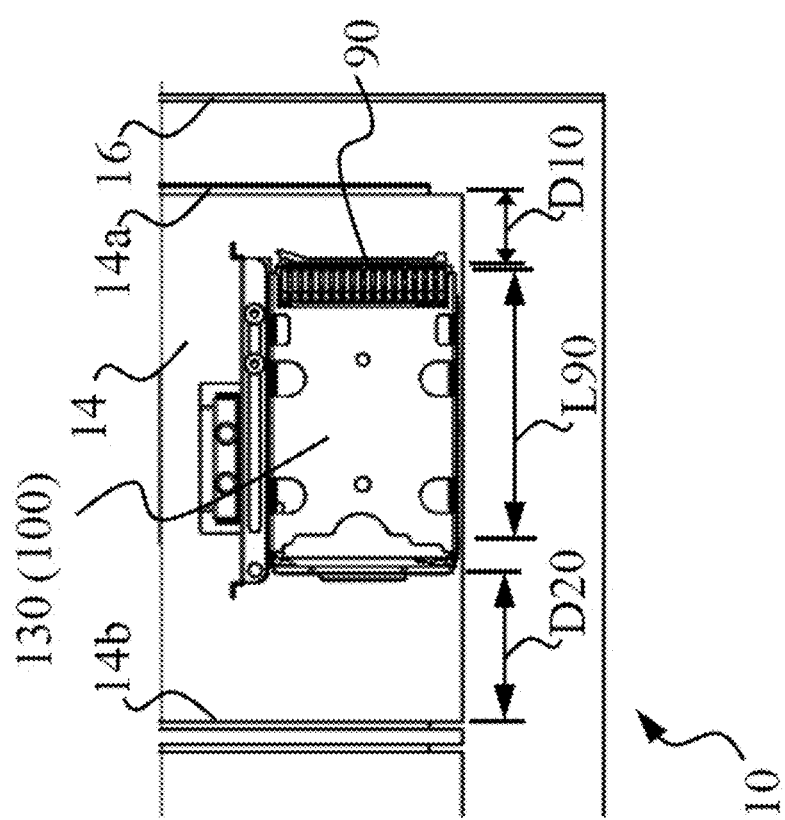
FIGS. 7A, 7B, 7C and 7D are top views of FIG. 6 illustrating movement of the support apparatus in a hard disk drive replacement process.
Figure 7B:
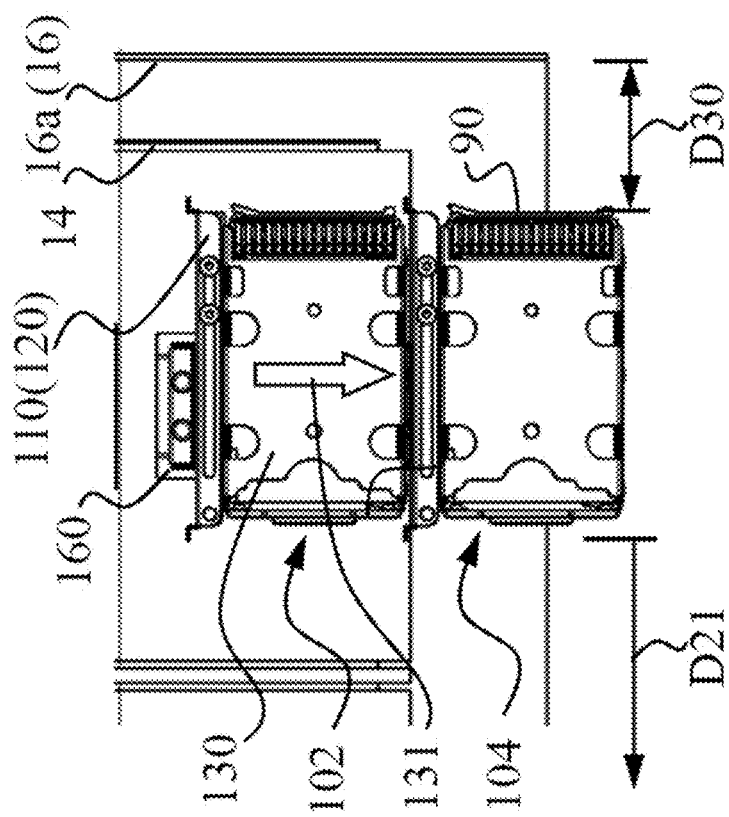

In a situation where hot-swap replacement of hard disk drive is desirable, as shown in FIGS. 7A, 7B, 7C and 7D, the cage 130 together with the primary bracket 110 and the secondary bracket 120 are firstly slid relative to the rail 160, along first movement direction 131, from an operating position 102, i.e. where the cage 130 and the hard disk drive 90 are inside the module 14 as shown in FIG. 7A, to a first cage position 104 i.e. where the cage 130 and the hard disk drive 90 are positioned outside of the module 14, as shown in FIG. 7B. At the operating position 102, both the front space D10 between the front edge of the hard disk drive 90 and the side wall 14a of the module 14, and the back space D20 between the back edge of the hard disk drive 90 and the other side wall 14b of the module 14, are shorter than the length L90 of the hard disk drive 90. At the first cage position 104, the front edge of the hard disk drive 90 faces a side wall 16a of the computer chassis 16, and the space D30 is shorter than the length L90 of the hard disk drive 90. The space D21 behind the back edge of the cage 130, is now cleared to allow further movement of the cage 130.

Figure 7C:
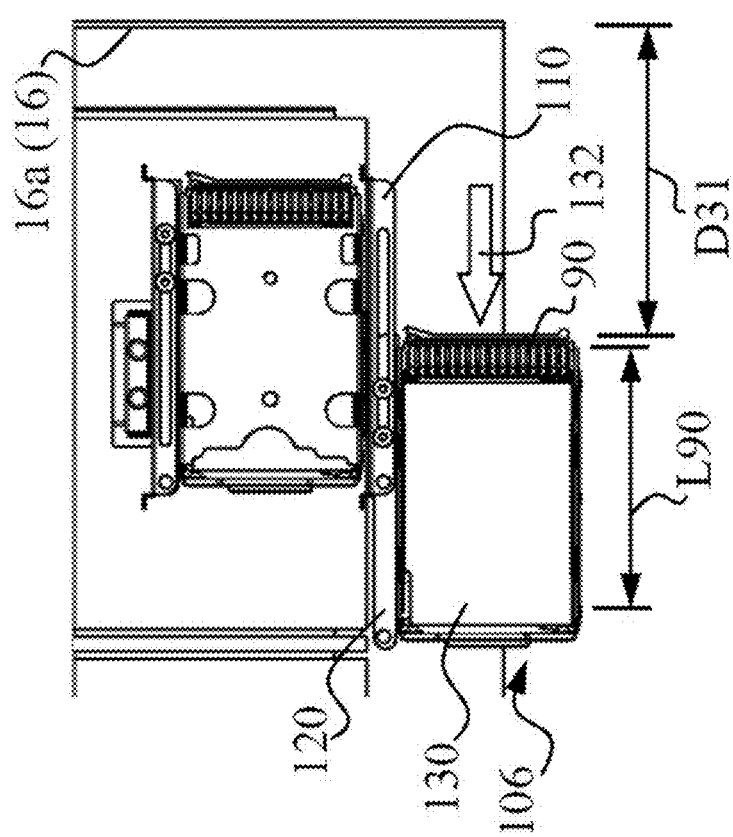
Figure 7D:
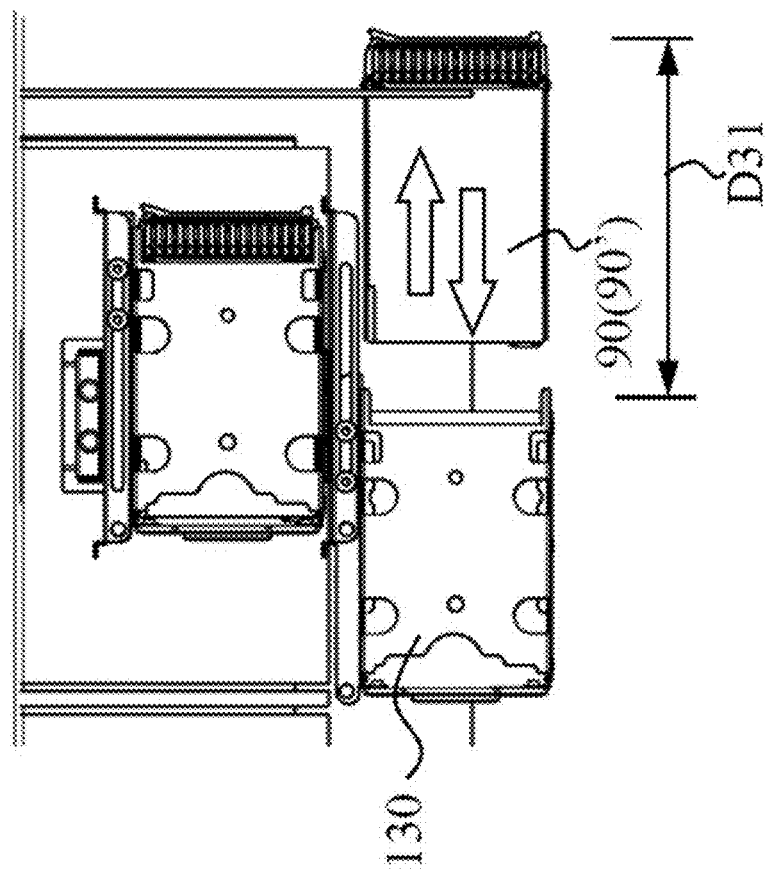

The cage 130 and the secondary bracket 120 are further slid from the first cage position 104, relative to the primary bracket 110 along a second movement direction 132, i.e. toward the back edge of the cage 130, toward a second cage position 106, as shown in FIG. 7C. Movement of the cage 130 toward the second cage position increased the clearance space D31 between the front edge of the hard disk drive 90 and the side wall 16a of the chassis 16 such that, the clearance space D31 becomes greater than the length L90 of the hard disk drive 90. As such, the hard disk drive 90 can be slid out of the cage 130, and new or replacement hard disk drive 90' may also be inserted into the cage 130 to perform hot-swap replacement, as shown in FIG. 7D.

Once the new/replacement hard disk drive 90' is inserted into the cage 130, the above movement steps may be executed in a reversed sequence to place the cage 130 back to the chassis 16 and the module 14 to complete the hard disk drive replacement operation and resume the normal operation of the computer system.

Figure 8:
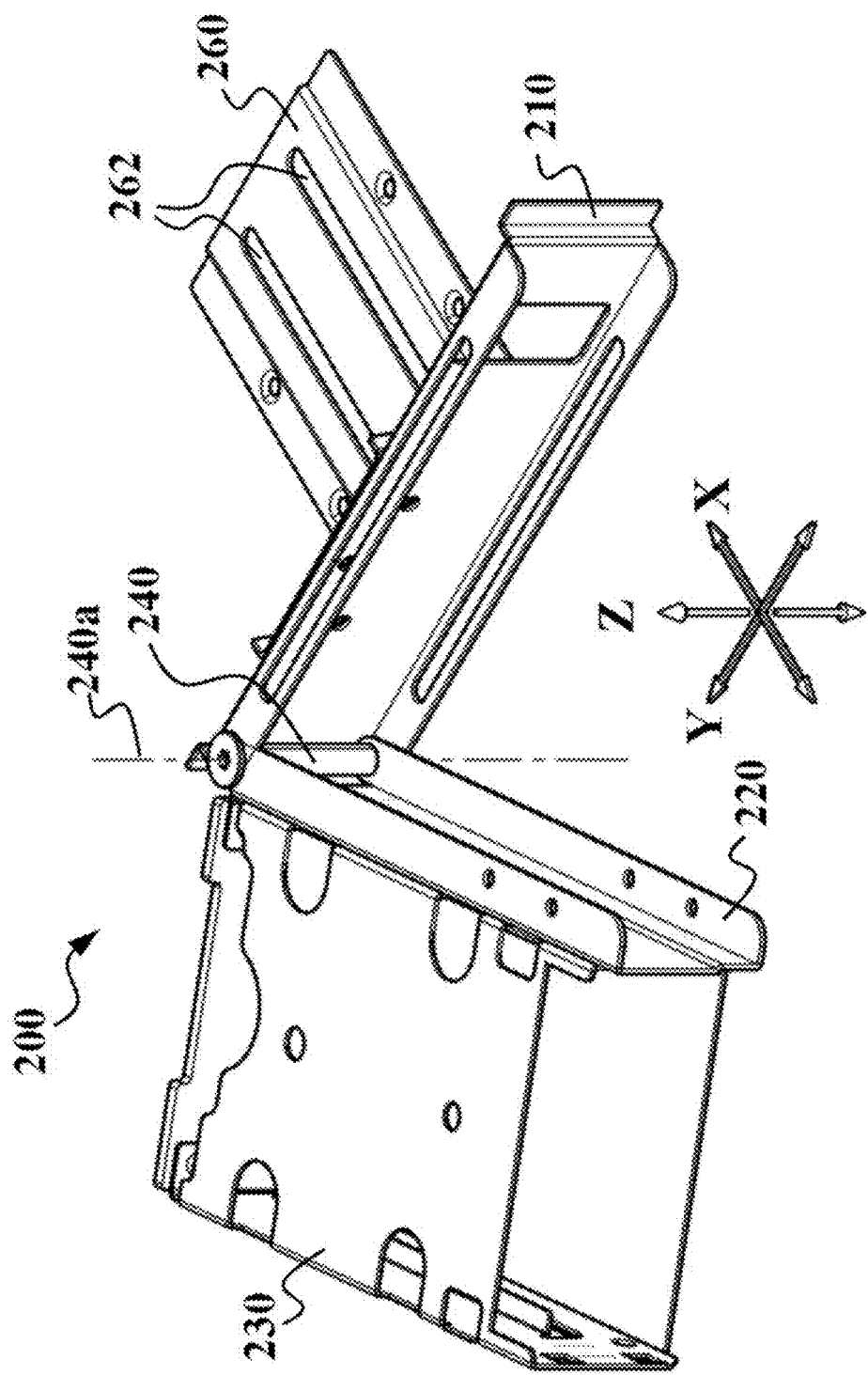
FIG. 8 is a perspective view illustrating a supporting apparatus according to another embodiment.

According to another embodiment, as shown in FIG. 8, a support apparatus 200 includes a rail 260, a primary bracket 210 movably coupled to the rail 260, a secondary bracket 220 movably coupled to the primary bracket 210, and a cage 230 mounted to the secondary bracket 220. The primary bracket 210 is slidably coupled to the rail 260, and is slidable relative to the rail 260 along X direction which is parallel to the slots 262 formed on the rail 260. As such, the primary bracket 210 and the rail 260 form a first kinematic pair to enable sliding movement of the primary bracket 210 relative to the rail 260, with one degree of freedom, to vary the position of the cage 230 relative to the rail 260.

The secondary bracket 220 is rotatably coupled to the primary bracket 210, though a pivot 240. Pivot 240 is arranged with the rotation axis 240a orthogonal to a main plane of the cage 230, i.e. pivot 240 is arranged orthogonal to the X-Y plane. As such, the cage 230 is rotatable about the pivot 240 relative to the primary bracket 210, to vary the position of the cage 230, within the X-Y plane, relative to the primary bracket 210 and the rail 260.

Figure 9:
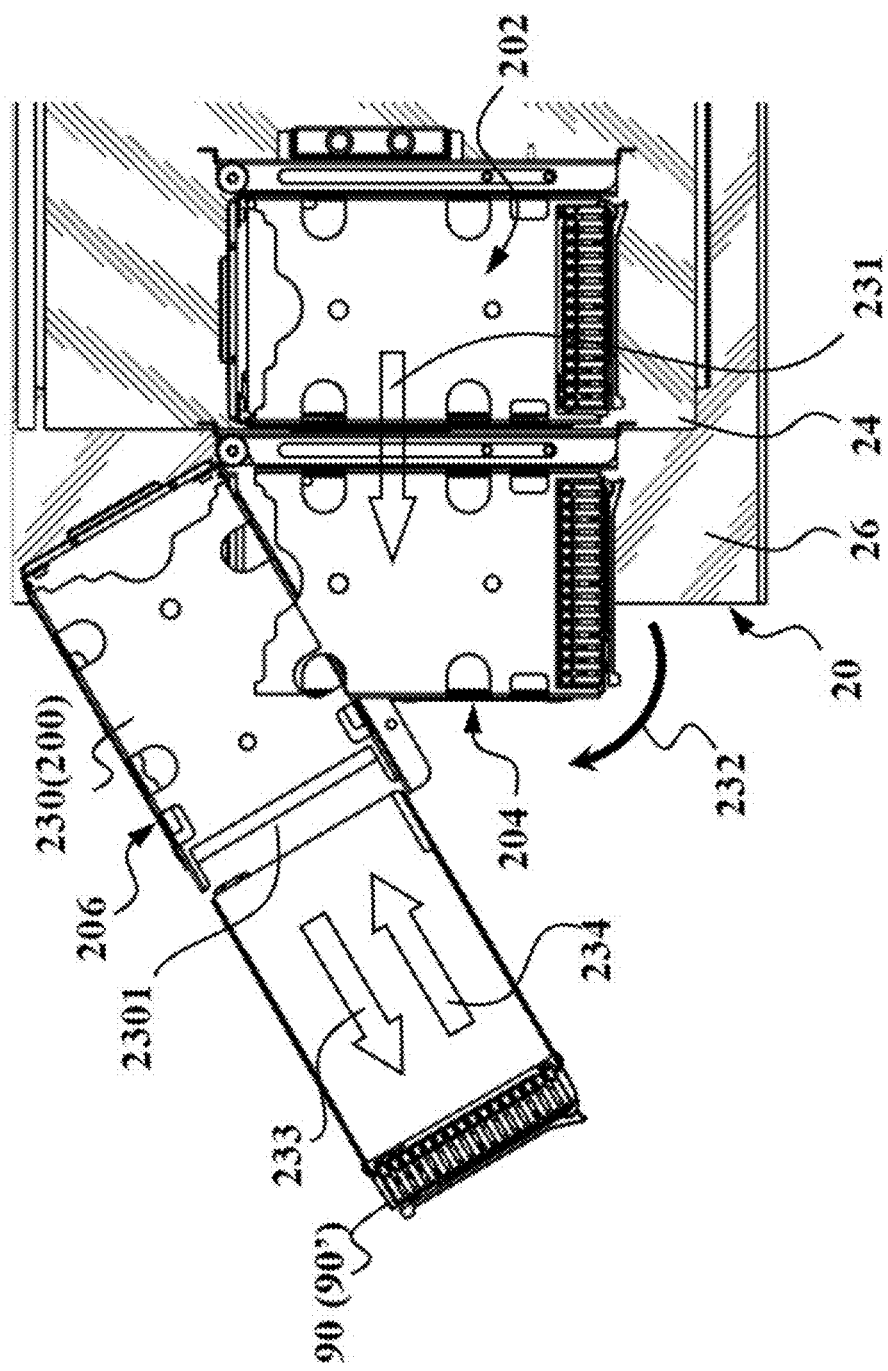
FIG. 9 is a top view of FIG. 8 illustrating movement of the support apparatus in a hard disk drive replacement process.

In use, as shown in FIG. 9, support apparatus 200 together with one or more hard disk drives 90 received in the cage 230, are assembled to an electronic system e.g. a computer 20, with the rail 260 mounted to a main board of a module 24 which is mounted to a chassis 26. In an operating position 202, the hard disk drive 90 is located in the module 24 and connected to other components of the module 24 to perform operational functions.

In situations where hot-swap replacement of hard disk drive(s) is desirable, the cage 230 together with the primary bracket 210 and the secondary bracket 220 are firstly slid relative to the rail 260, along first movement direction 231, from the operating position 202, i.e. where the cage 230 and the hard disk drive 90 are inside the module 24, to an first cage position 204 i.e. where the cage 230 and the hard disk drive 90 are outside of the module 24.

The cage 230 and the secondary bracket 220 are further rotated from the first cage position 204, along second movement direction 232 and relative to the primary bracket 210 about the pivot 240, toward a second cage position 206.

At the second cage position 206, the front opening 2301 of the cage 230 faces an increased, unblocked clearance space which is sufficient to allow the hard disk drive 90 drawn out from the cage 230 along removal direction 233, and to allow assembling of a new/replacement hard disk drive 90' into the cage 230 along insertion direction 234.

Once the new/replacement hard disk drive 90' is inserted into the cage 230, the above movement steps may be executed in a reversed sequence to place the cage back to the chassis 26 and the module 24, to complete the hard disk drive replacement operation and resume the normal operation of the computer system.

Figure 10:
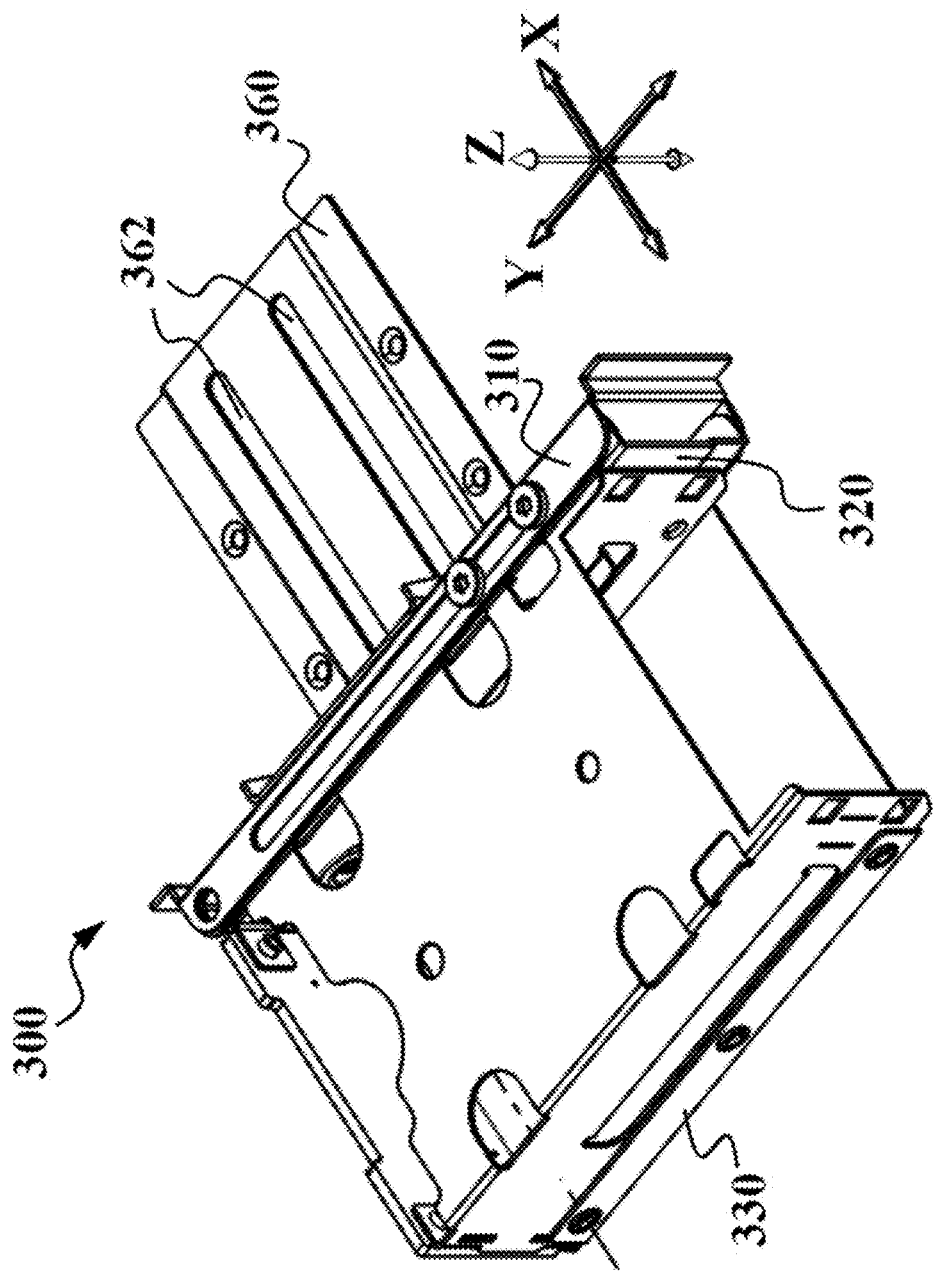
FIG. 10 is a perspective view illustrating a supporting apparatus according to yet another embodiment.
Figure 11:
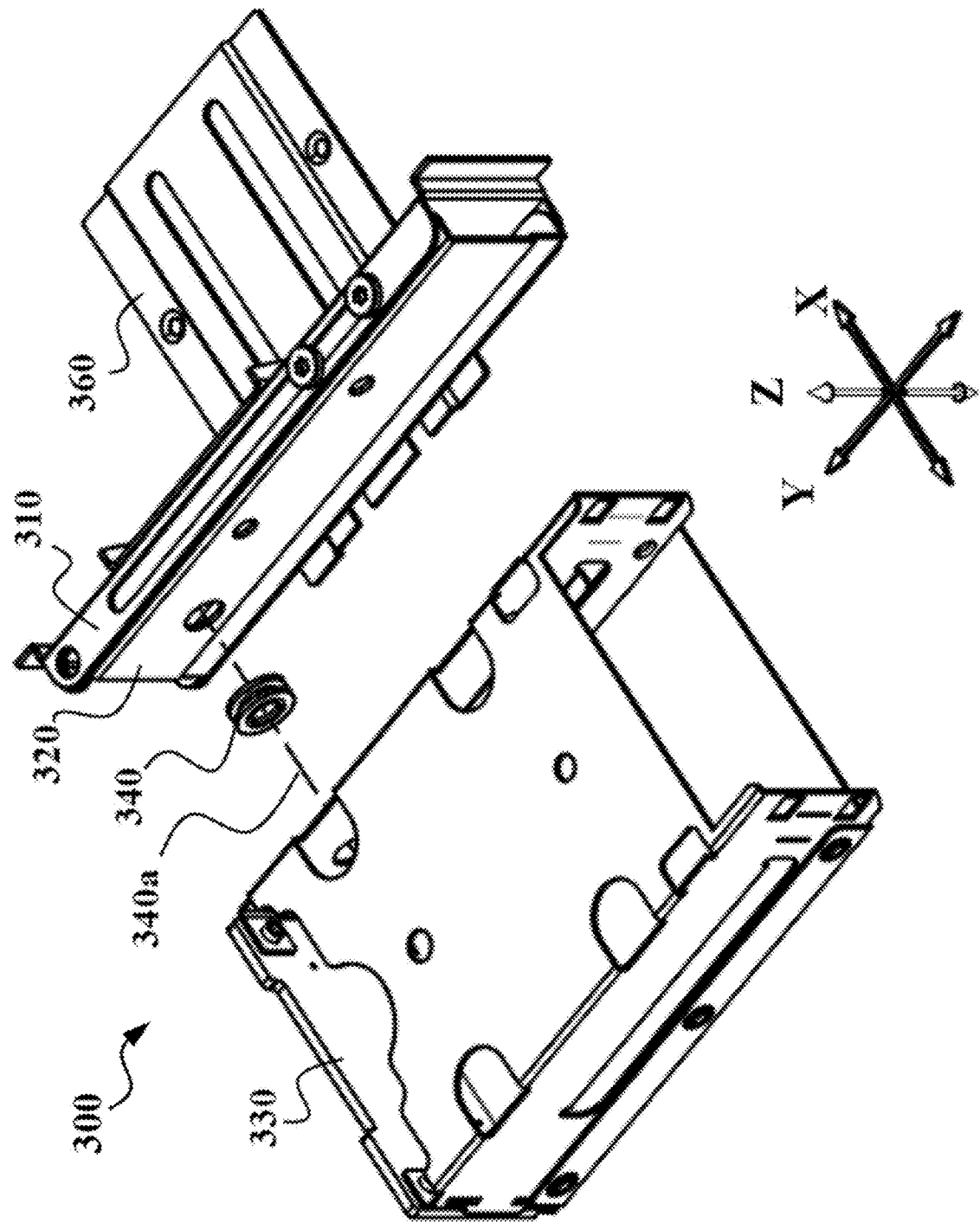
FIG. 11 is an exploded view of FIG. 10.
Figure 12:
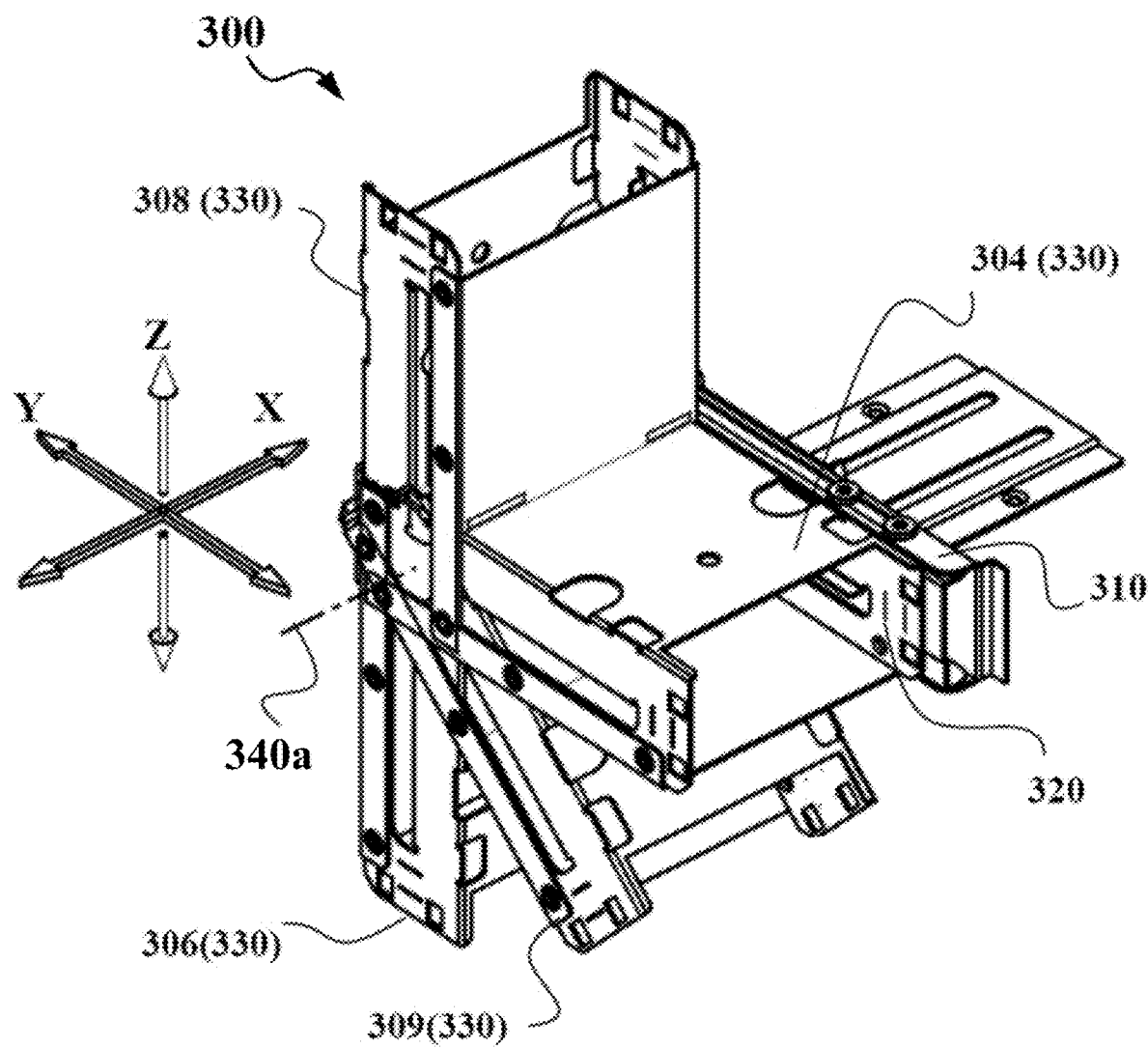
FIG. 12 is a perspective view illustrating movement of the support apparatus shown in FIG. 10.

According to yet another embodiment, as shown in FIGS. 10, 11 and 12, a support apparatus 300 includes a rail 360, a primary bracket 310 movably coupled to the rail 360, a secondary bracket 320 (not shown) coupled to the primary bracket 310, and a cage 330 movably coupled to the secondary bracket 320 (not shown). The primary bracket 310 is slidably coupled to the rail 360 and is slidable relative to the rail 360 along X direction which is parallel to the slots 362 of the rail 360. As such, the primary bracket 310 and the rail 360 form a first kinematic pair to enable sliding movement of the primary bracket 310 relative to the rail 360, with one degree of freedom, to vary the position of the cage 330 relative to the rail 360.

The secondary bracket 320 (not shown) is fixed to the primary bracket 310. Cage 330 is rotatably coupled to the secondary bracket 320 (not shown), through a pivot 340. Pivot 340 is arranged with the rotation axis 340a parallel to a main plane of the cage 330, i.e. pivot 340 is arranged with the rotation axis 340a parallel to the X-Y plane. As such, the cage 330 is rotatable about the pivot 340 relative to the secondary bracket 320 (not shown), to vary the position of the cage 330 within the Y-Z plane, relative to the secondary bracket 320 (not shown), the primary bracket 310 and the rail 360. Shown in FIG. 12 as examples, the cage 330 is rotatable about pivot axis 340a from an intermediate horizontal position 304 toward a downward position 306, an upward position 308 or any arbitrary position 309 angled with respect to the horizontal position 304.

Figure 13:
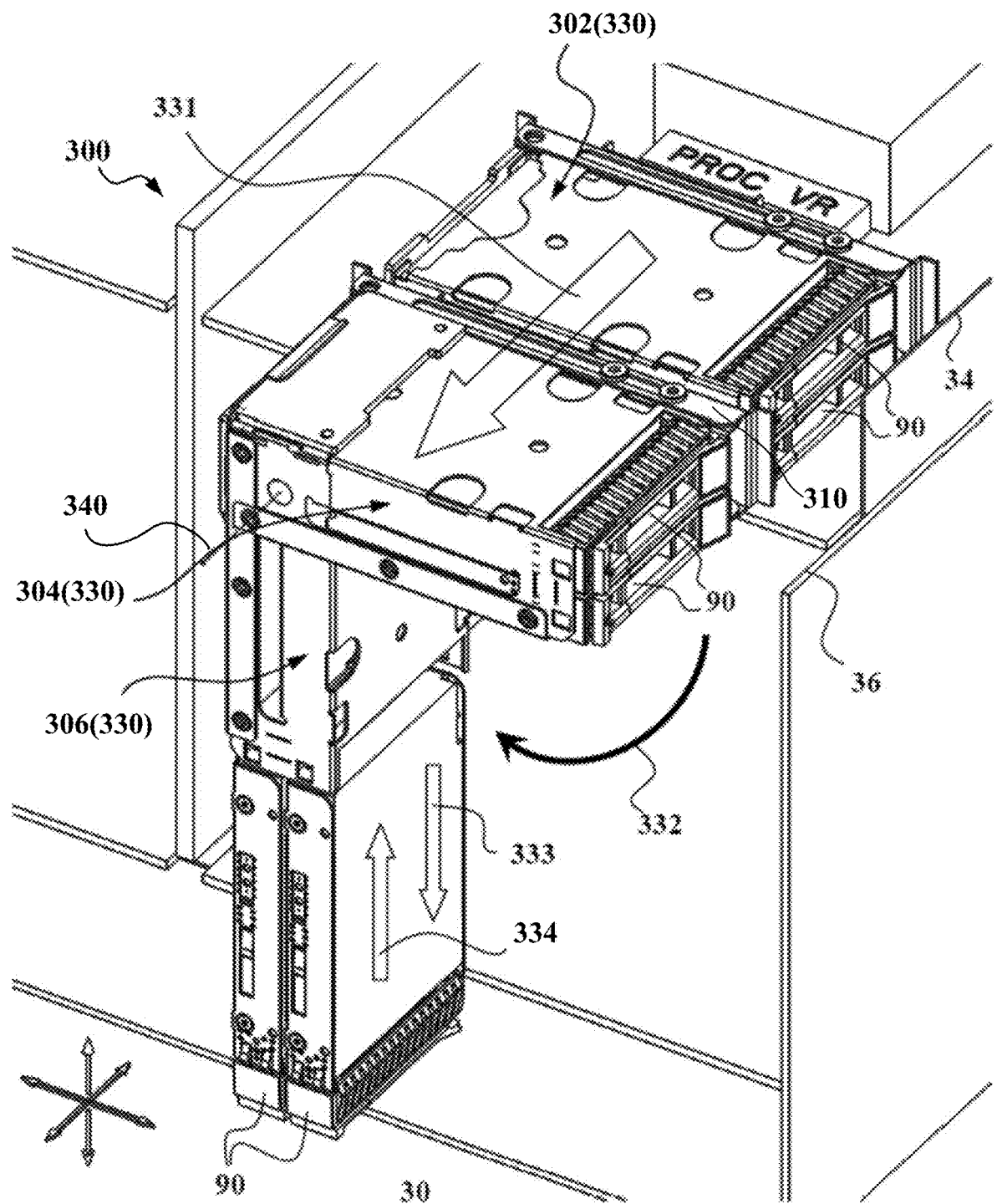
FIG. 13 is a perspective view illustrating movement of the support apparatus shown in FIG. 10 in a hard disk drive replacement process.

In use, as shown in FIG. 13 as an example, support apparatus 300 together with hard disk drive(s) 90 received in the cage 330, are assembled to an electronic system e.g. a computer 30, with the rail mounted to a main board of a module 34 which is mounted to a chassis 36 of computer 30. In an operating position 302, the hard disk drives 90 are located in the module 34 and connected to other components of the module 34 to perform operational functions.

In case where hot-swap replacement of hard disk drive is desirable, the cage 330 together with the primary bracket 310 and the secondary bracket (not shown) are firstly slid relative to the rail, along first movement direction 331, from the operating position 302, i.e. where the cage 330 and the hard disk drives 90 are inside the module 34, to a first cage position 304 i.e. where the cage 330 and the hard disk drives 90 are outside of the module 34.

As the support apparatus 300 and the hard disk drives are mounted to a top portion of the chassis 36, as the example shown in FIG. 13, there are more space below the first cage position available for further movement and placement of the cage 330 as well as for the drawn-out/insertion operation of hard disk drives 90 from/into the cage 330. The cage 330 and the secondary bracket (not shown) can therefore be rotated from the first cage position 304 along downward rotation direction 332, relative to the primary bracket 310 about the pivot 340, to a second cage position 306.

At the second cage position 306, the front opening 330a of the cage 330 faces an increased clearance space 330b which is sufficient to allow removal of the hard disk drives 90 from the cage 330, along drawn-out direction 333, and insertion of a new/replacement hard disk drive 90' into the cage 330 along insertion direction 334.

It should be appreciated that if the support apparatus 300 and the one or more hard disk drives are mounted to a bottom portion of the chassis 306, the cage 330 and the secondary bracket (not shown) are rotatable from the first cage position in an upward rotation direction that is opposite to the downward rotation direction 332.

Once the new/replacement hard disk drive 90' is inserted into the cage 330 and positioned in place, the above-illustrated movement steps may be executed in a reverse sequence to place the cage 330 back to the chassis 36 and the module 34 to complete the hard disk drive replacement operation, and resume the normal operation of the computer system.

Figure 14:
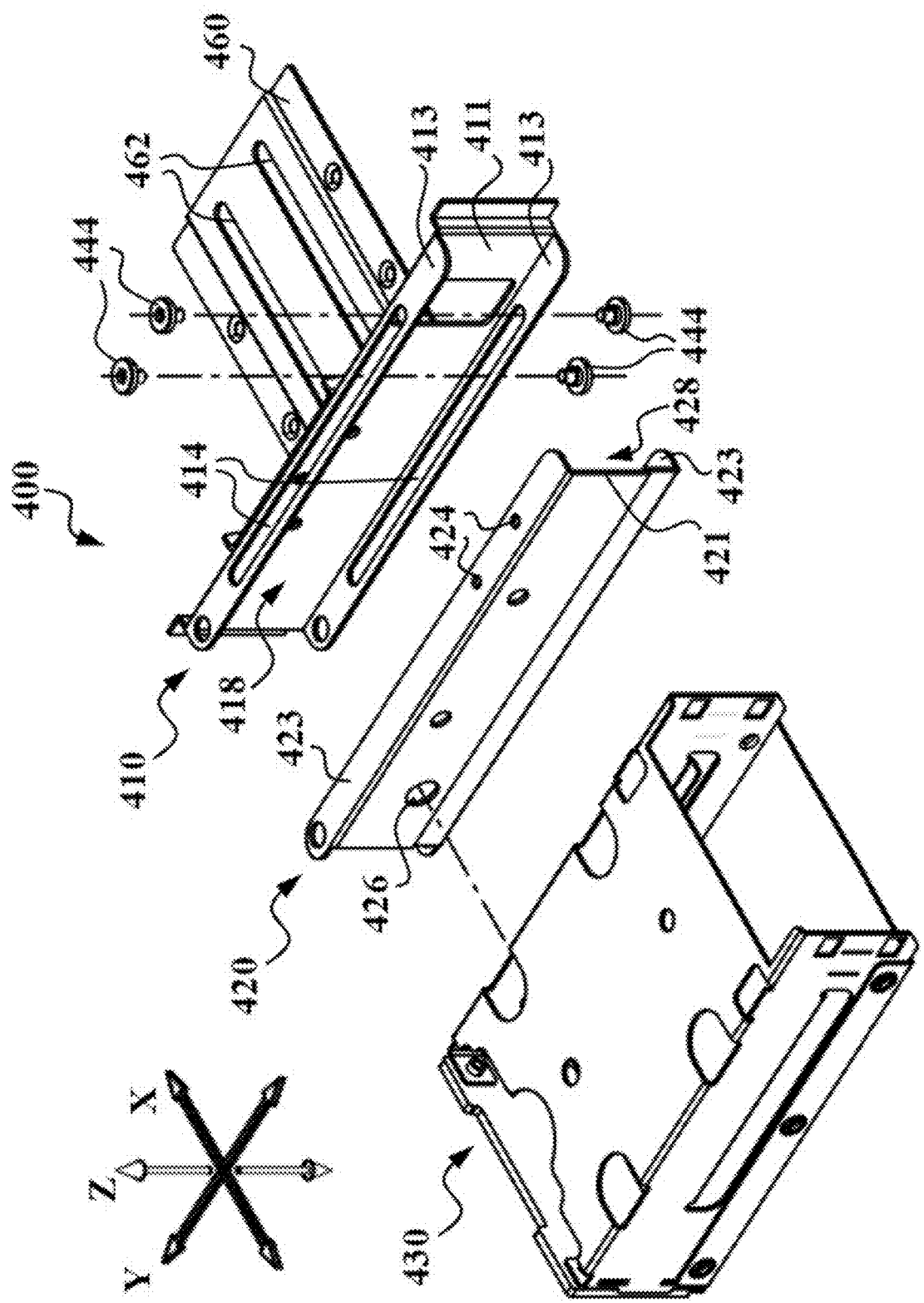
FIG. 14 is an exploded perspective view illustrating a supporting apparatus according to still another embodiment.
Figure 15:
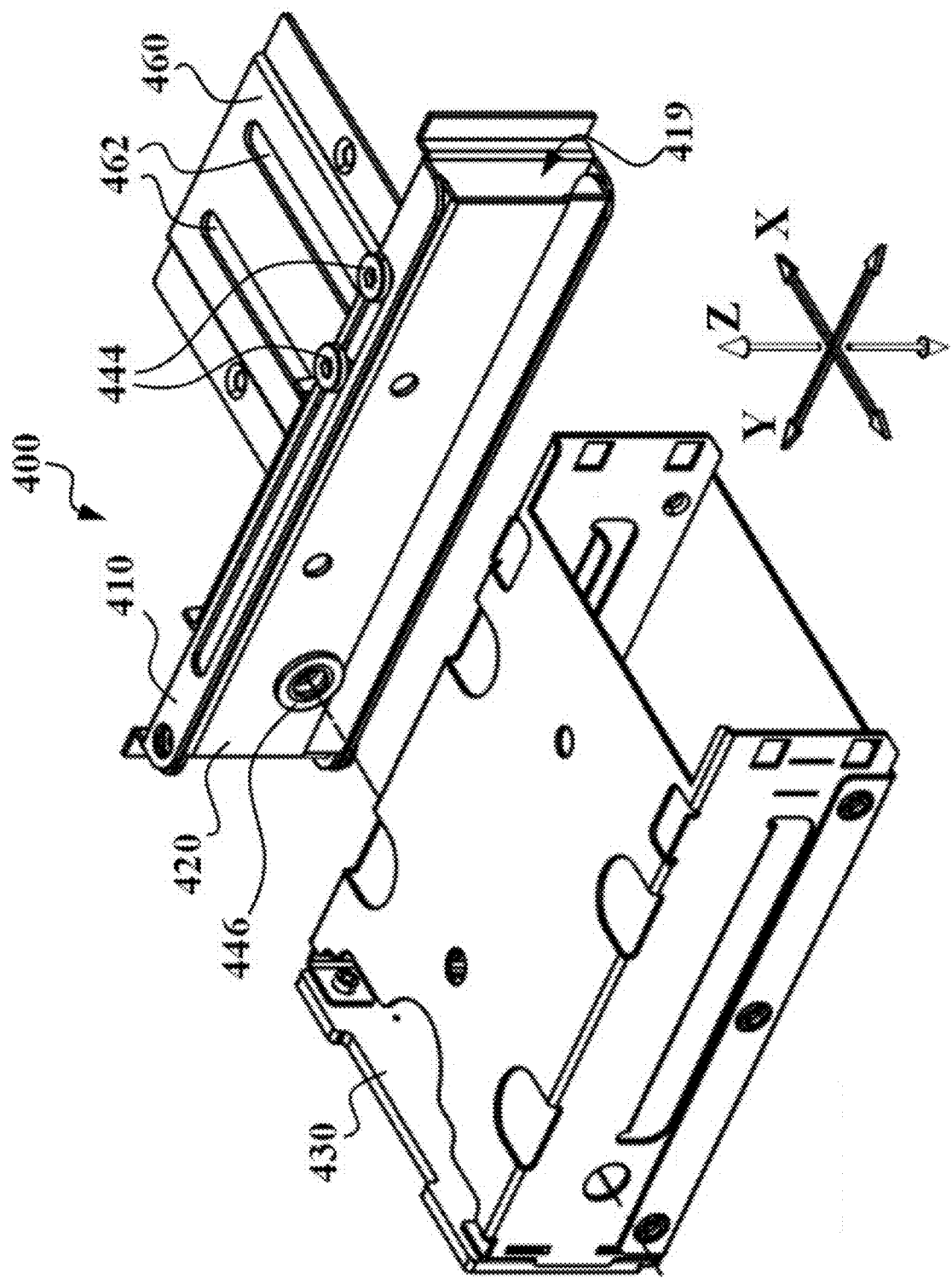
FIG. 15 is a perspective view of FIG. 14 in which parts of the support apparatus are assembled.
Figure 16:
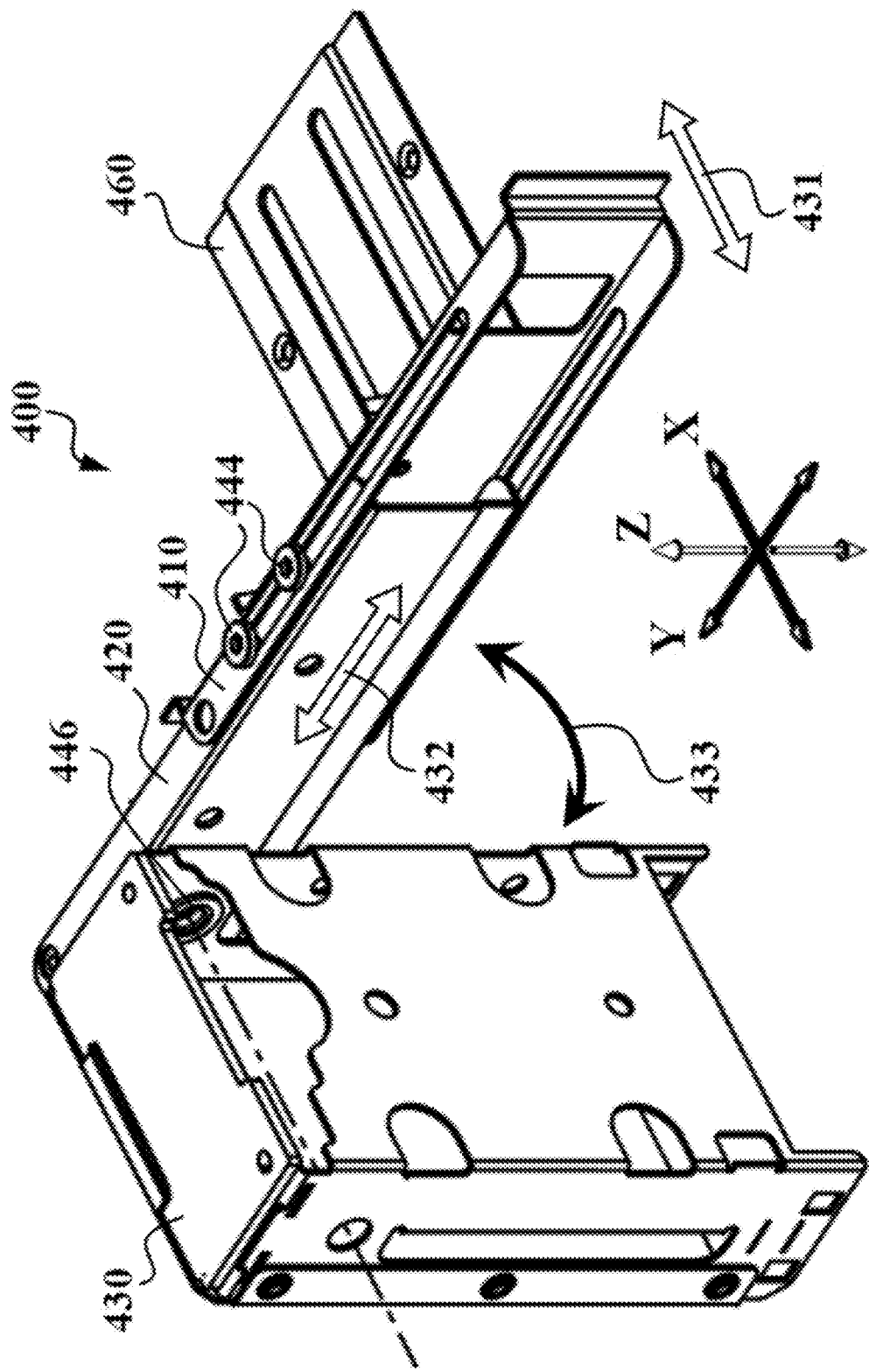
FIG. 16 is a perspective view illustrating the movement of the support apparatus of FIG. 14.

According to still another embodiment, as shown in FIGS. 14, 15 and 16, a support apparatus 400 includes a rail 460, a primary bracket 410 movably coupled to the rail 460, a secondary bracket 420 movably coupled to the primary bracket 410, and a cage 430 movably coupled to the secondary bracket 420. The primary bracket 410 is slidably coupled to the rail 460 and is slidable relative to the rail 460 along X direction which is parallel to the slots 462 of the rail 460. As such, the primary bracket 410 and the rail 460 form a first kinematic pair to enable sliding movement of the cage 430 relative to the rail 460, along first movement direction 431 parallel to the X-direction, to vary the position of the primary bracket 410 relative to the rail 460.

The primary bracket 410 has an elongated base portion 411 and a pair of side walls 413 extending perpendicularly from the base portion 411, by which, the primary bracket 410 is formed of a channel 418 of a rectangle shape in cross section. Three sides of the channel 418 are formed by the base portion 411 and the pair of side walls 413, respectively, and the remaining side of the channel 418 is left open. On each of the side walls 413 there is formed a slot 414 parallel to the elongated base portion 411 i.e. parallel to the Y-direction.

The secondary bracket 420 has an elongated base portion 421 and a pair of side walls 423 extending perpendicularly from the base portion 421 by which, the secondary bracket 420 is formed of a channel 428 of a rectangle shape in cross section. Three sides of the channel are formed by the base portion 421 and the pair of side walls 423, respectively, and the remaining side of the channel is left open. On each of the side walls 423 there are formed two mounting holes 424. On the base portion 421 there is formed a bearing hole 426.

The secondary bracket 420 is configured with a shape and dimension suitable to be fitted into the primary bracket 410. The primary bracket 410 and the secondary bracket 420 are coupled to each other, with the open sides of the channels 418, 428 facing each other to form a combined channel 419 having four closed side walls. Fastening elements 444 such as screws, rivets or the like connect the primary bracket 410 and the secondary bracket 420 by passing through the slots 414 and secured to the mounting holes 424. The secondary bracket 420 is therefore capable of sliding relative to the primary bracket 410, along a second movement direction 432 which is orthogonal to the first movement direction 431.

The cage 430 is coupled to the secondary bracket 420, via a pivot 446 coupling to the bearing hole 426 such that the cage 430 is rotatable relative to the secondary bracket 420 about the pivot 446 at rotation direction 433, as shown in FIG. 16.

Structured in the above-illustrated manner, support apparatus 400 provides a mechanism with the primary bracket 410, the secondary bracket 420 and the cage 430 being movable elements, upon the rail 460 being mounted to a base such as a main board of a computer chassis. Accordingly, a first kinematic pair is formed by the primary bracket 410 and the rail 460, a second kinematic pair is formed by the secondary bracket 420 and the primary bracket 410, and a third kinematic pair is formed by the cage 430 and the secondary bracket 420. The first kinematic pair is a lower pair enabling sliding movement of the primary bracket 410 relative to the rail 460. The second kinematic pair is a lower pair enabling sliding movement of the secondary bracket 420 relative to the primary bracket 410. The third kinematic pair is a lower pair enabling rotational movement of the cage 430 relative to the secondary bracket 420.

Upon the rail 460 being mounted to a base such as a computer or module chassis or a main board, support apparatus 400 provides a mechanism having three moving bodies and three kinematic lower pairs. Accordingly, the cage 430 has three degrees of freedom relative to the rail 460. Used for mounting hard disk drives in a computer system, the support apparatus 400 enables movement of the cage 430 with more movement choices for hard disk drive replacement under hot-swap operation, to better adapt to the tight space or room available for accommodating hard disk drives in a computer system.

Figure 17:
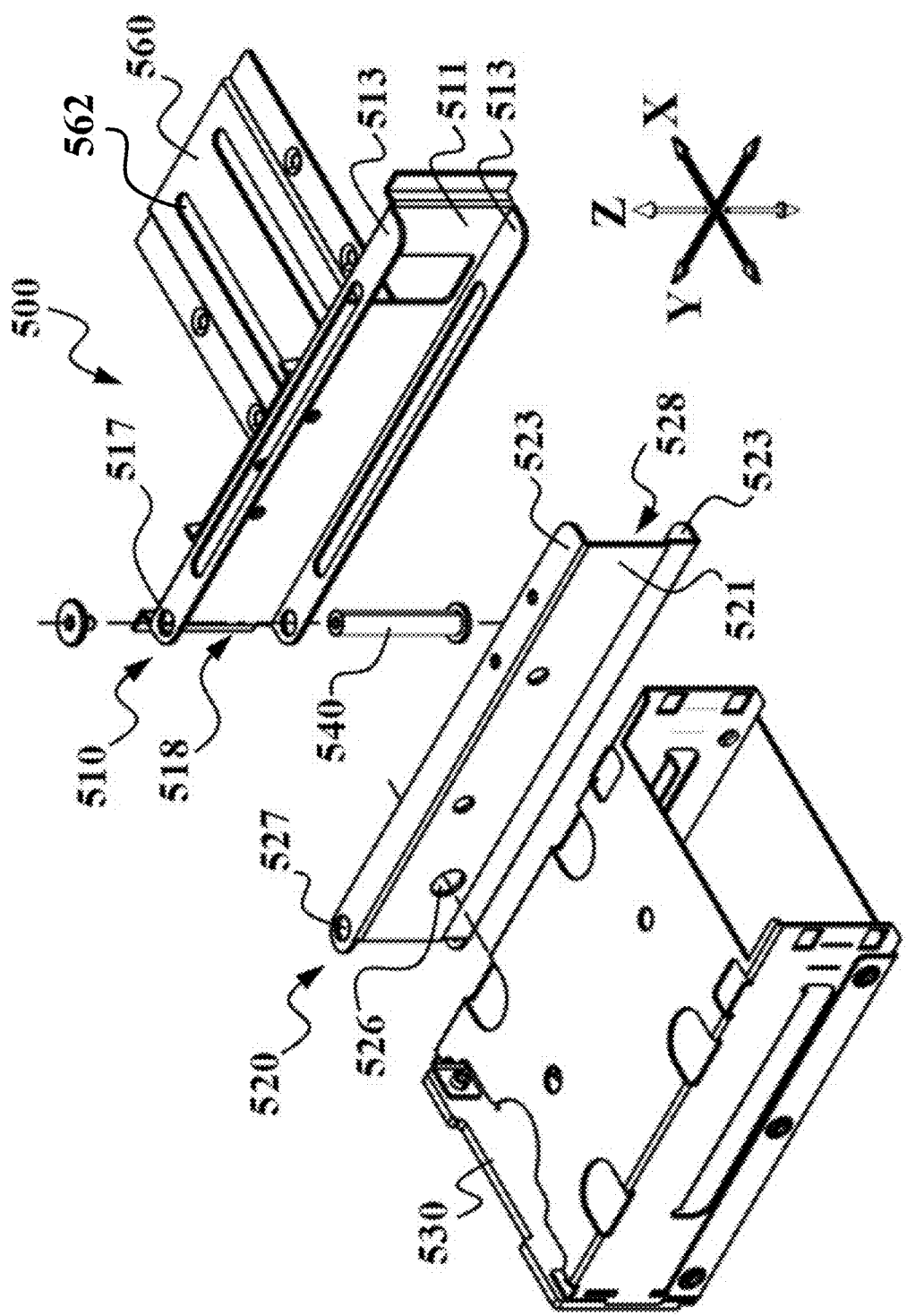
FIG. 17 is an exploded perspective view illustrating a supporting apparatus according to a further embodiment.
Figure 18:
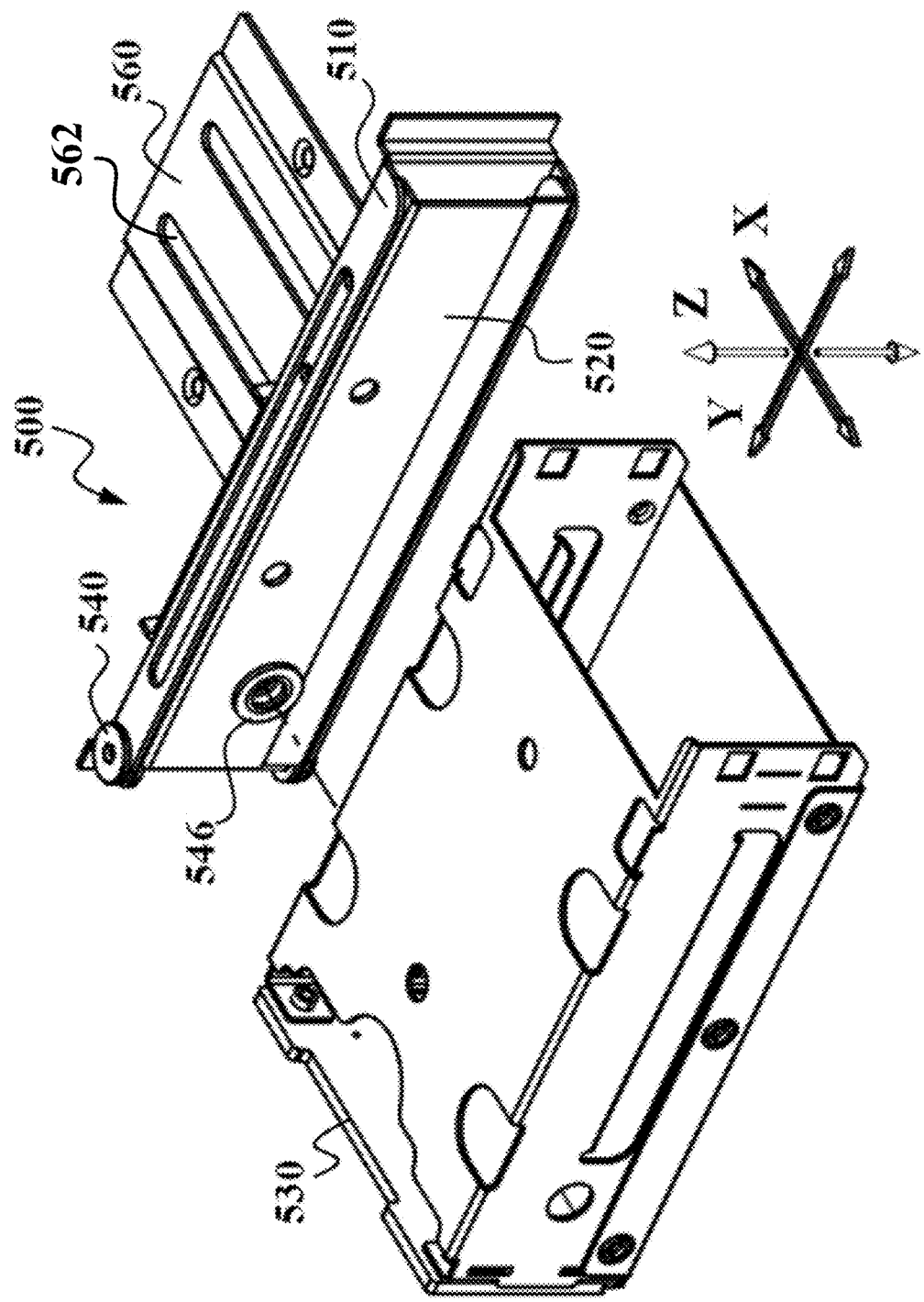
FIG. 18 is a perspective view of FIG. 17 in which parts of the support apparatus are assembled.
Figure 19:
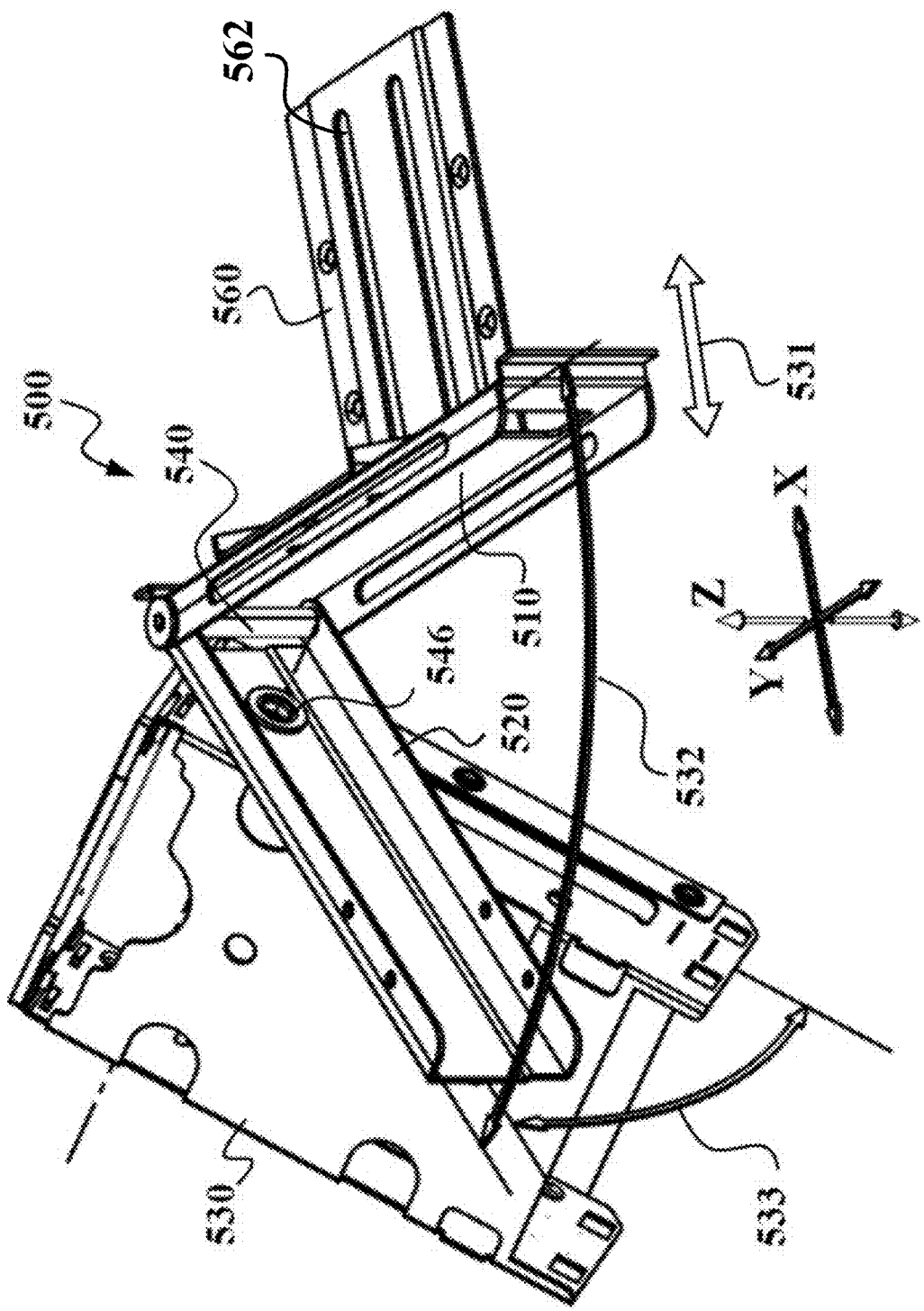
FIG. 19 is a perspective view illustrating the movement of the support apparatus of FIG. 17.

According to a further embodiment, as shown in FIGS. 17, 18 and 19, a support apparatus 500 includes a rail 560, a primary bracket 510 movably coupled to the rail 560, a secondary bracket 520 movably coupled to the primary bracket 510, and a cage 530 movably coupled to the secondary bracket 520. The primary bracket 510 is slidably coupled to the rail 560 and is slidable relative to the rail 560 along X direction which is parallel to the slots 562 of the rail 560. As such, the primary bracket 510 and the rail 560 form a first kinematic pair to enable sliding movement of the cage 530 relative to the rail 560, along first direction 531 parallel to the X-direction, to vary the position of the primary bracket 510 relative to the rail 560.

The primary bracket 510 has an elongated base portion 511 and a pair of side walls 513 extending perpendicularly from the base portion 511, by which, the primary bracket 510 is formed of a channel 518 of a rectangle shape in cross section. Three sides of the channel 518 are formed by the base portion 511 and the pair of side walls 513, respectively, and the remaining side of the channel 518 is left open. On each of the side walls 513 there is formed a first pivot hole 517.

The secondary bracket 520 has an elongated base portion 521 and a pair of side walls 523 extending perpendicularly from the base portion 521, by which, the secondary bracket 520 is formed of a channel 528 of a rectangle shape in cross section. Three sides of the channel 528 are formed by the base portion 521 and the pair of side walls 523, respectively, and the remaining side of the channel is left open. On the base portion 521 there is formed a bearing hole 526. On each of the side walls 523 there is formed a second pivot hole 527.

The secondary bracket 520 is configured with a shape and dimension suitable to be fitted into the primary bracket 510. The primary bracket 510 and the secondary bracket 520 are coupled to each other, with the open sides of the channels 518 and 528 facing each other to form a substantially enclosed channel 519 (see FIG. 21) having four side walls. A pivot pin 540 connects the primary bracket 510 and the secondary bracket 520 by passing through the first and second pivot holes 517 and 527. The secondary bracket 520 is therefore capable of rotating relative to the primary bracket 510, about the pivot pin 540. The pivot pin 540 is oriented in a direction parallel to the Z-direction and accordingly, the secondary bracket 520 is rotatable relative to the primary bracket 510 within the X-Y plane, along a first rotational direction 532.

The cage 530 is coupled to the secondary bracket 520, via a pivot hinge 546 coupling the bearing hole 526 such that the cage 530 is rotatable relative to the secondary bracket 520 about the pivot hinge 546 at a second rotation direction 533, as shown in FIG. 19.

Structured in the above-illustrated manner, support apparatus 500 provides a mechanism with the primary bracket 510, the secondary bracket 520 and the cage 530 being movable elements, upon the rail 560 being mounted to a base such as a main board of a computer chassis. Accordingly, a first kinematic pair is formed by the primary bracket 510 and the rail 560, a second kinematic pair is formed by the secondary bracket 520 and the primary bracket 510, and a third kinematic pair is formed by the cage 530 and the secondary bracket 520. The first kinematic pair is a lower pair enabling sliding movement of the primary bracket 510 relative to the rail 560. The second kinematic pair is a lower pair enabling rotational movement of the secondary bracket 520 relative to the primary bracket 510 about the pivot pin 540. The third kinematic pair is a lower pair enabling rotational movement of the cage 530 relative to the secondary bracket 520 about the pivot hinge 546.

Upon the rail 560 being mounted to a base such as a computer or module chassis or a main board, support apparatus 500 provides a mechanism having three moving bodies and three kinematic lower pairs. Accordingly, the cage 530 has three degrees of freedom with respect to the rail 560. Used for mounting hard disk drives in a computer system, the support apparatus 500 enables movement of the cage 530 with more movement choices for hard disk drive replacement under hot-swap operation, to better adapt to the tight space or room available for accommodating hard disk drives in a computer system.

Figure 20:
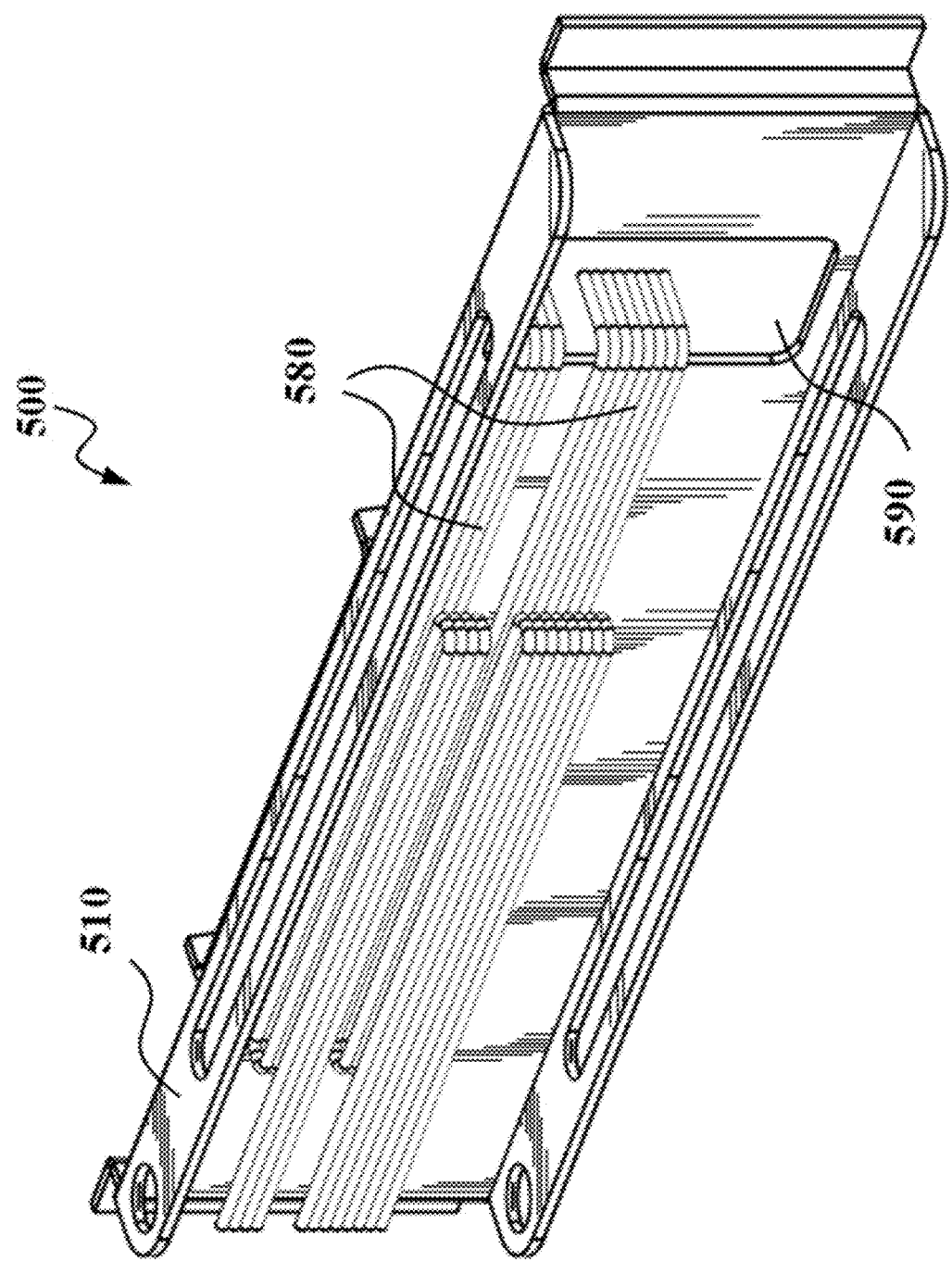
FIG. 20 is a perspective view of a primary bracket of the support apparatus as previously illustrated.
Figure 21:
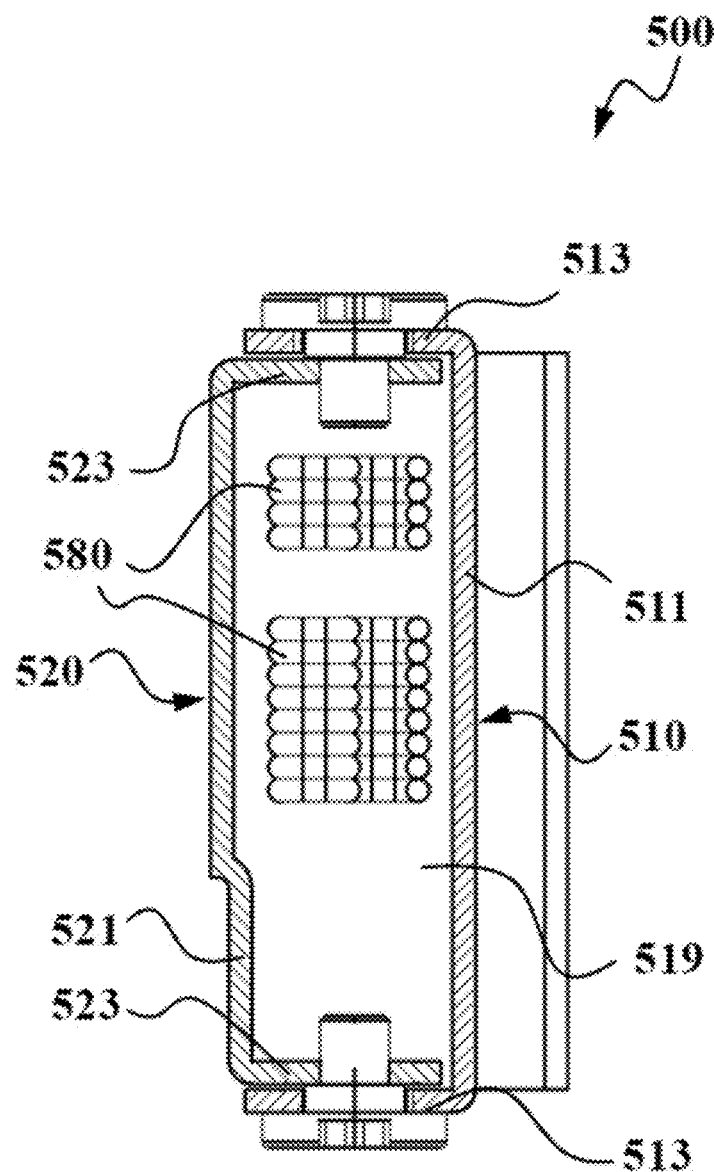
FIG. 21 is a side view of a primary bracket and a secondary bracket of the support apparatus as previously illustrated.

As shown in FIGS. 20 and 21, the channel 519 formed by the base portion 511 and the pair of side walls 513 of the first bracket 510, and by the base portion 521 and the pair of side walls 523 of the second bracket 520, provide a space within which, data cables and power cables 580 for connecting to the hard disk drives may be accommodated. Upon the secondary bracket 520 being assembled to the primary bracket 510, the cables 580 may be disposed in the channel 519 and arranged to connect to the main board of the computer, through a window 590 formed on the primary bracket. In hot-swap hard disk drive replacement operations, during the process of the cage movement away from/toward the main board, the module or the chassis, the cables are deformed to follow the movement of the cage, to maintain data and power connection with the hard disk drives as required by the replacement operations.

It should be appreciated that while illustrated following the description for the embodiment of support apparatus 500, the primary and secondary brackets forming a channel capable for accommodating data/power cables for connecting to hard disk drives may also be applicable to support apparatus of other embodiment as described in the contexts and in conjunction with respective figures.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A support apparatus for supporting a disk drive relative to a computing system, the support apparatus comprising:
   a rail;
   a primary bracket slidably coupled to the rail to form a primary kinematic pair;
   a cage configured to hold the hard disk drive, the cage being coupled to a secondary bracket which is movably coupled to the primary bracket;
   wherein the cage is movable relative to the rail from an operating position to a first cage position, wherein the operating position comprises the hard disk drive coupled to other components of the computing system to perform operational functions, and wherein the first cage position provides a clearance space behind the cage, and
   wherein the secondary bracket and the cage are subsequently movable relative to the primary bracket from the first cage position toward a second cage position to provide a clearance space in front of the cage sufficient to remove the hard disk drive from the cage.

2. The apparatus of claim 1, wherein the cage is slidably coupled to the primary bracket to form a secondary kinematic pair, the cage is slidable relative to the primary bracket from the first cage position toward the second cage position.

3. The apparatus of claim 1, wherein the cage is rotatably coupled to the primary bracket to form a secondary kinematic pair, the cage is rotatable relative to the primary bracket from the first cage position toward the second cage position.

4. The apparatus of claim 3, wherein the cage is rotatably coupled to the primary bracket about a pivot orthogonal to a main plane of the cage.

5. The apparatus of claim 1, wherein the secondary bracket is slidably coupled to the primary bracket to form a secondary kinematic pair, wherein the secondary bracket and the cage are slidable relative to the primary bracket from the first cage position toward the second cage position.

6. The apparatus of claim 5, wherein the primary bracket is slidable relative to the rail along a first direction, and the secondary bracket and the cage are slidable relative to the primary bracket along a second direction orthogonal to the first direction.

7. The apparatus of claim 6, wherein the secondary bracket is rotatably coupled to the primary bracket to form a secondary kinematic pair, and the secondary bracket and the cage are rotatable relative to the primary bracket from the first cage position toward the second cage position.

8. The apparatus of claim 7, wherein the secondary bracket is rotatably coupled to the primary bracket through a pivot orthogonal to a main plane of the cage.

9. The apparatus of claim 1, wherein the cage is rotatably coupled to the secondary bracket through a pivot parallel to a main plane of the cage.

10. The apparatus of claim 1, wherein the primary bracket and the secondary bracket are coupled to each other to form a channel therebetween, wherein the channel is to accommodate an electrical cable therein.

* * * * *